United States Patent
Mars

(10) Patent No.: US 11,735,178 B1
(45) Date of Patent: Aug. 22, 2023

(54) SPEECH-PROCESSING SYSTEM

(71) Applicant: Amazon Technologies, Inc., Seattle, WA (US)

(72) Inventor: Robert John Mars, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 483 days.

(21) Appl. No.: 16/902,583

(22) Filed: Jun. 16, 2020

(51) Int. Cl.
G10L 15/22 (2006.01)
G10L 15/08 (2006.01)

(52) U.S. Cl.
CPC .............. G10L 15/22 (2013.01); G10L 15/08 (2013.01); G10L 2015/088 (2013.01); G10L 2015/223 (2013.01)

(58) Field of Classification Search
CPC ... G10L 15/22; G10L 15/08; G10L 2015/088; G10L 2015/223
See application file for complete search history.

(56) References Cited

U.S. PATENT DOCUMENTS

| | | | |
|---|---|---|---|
| 9,093,076 B2 * | 7/2015 | Fry | G10L 15/32 |
| 10,224,035 B1 * | 3/2019 | Koenig | G10L 15/22 |
| 2005/0177371 A1 * | 8/2005 | Yacoub | G10L 15/32 |
| | | | 704/270.1 |
| 2014/0265209 A1 * | 9/2014 | Dodds | B62M 1/14 |
| | | | 280/219 |
| 2020/0258513 A1 * | 8/2020 | Smith | G10L 15/30 |
| 2022/0223150 A1 * | 7/2022 | Li | G10L 15/22 |

* cited by examiner

Primary Examiner — Linda Wong
(74) Attorney, Agent, or Firm — Pierce Atwood LLP

(57) ABSTRACT

A user device may include a first and second wakeword-detection components. If the first wakeword-detection component determines that first audio data includes a representation of a first wakeword, the user device communicates with a first speech-processing system corresponding to the first wakeword. While the communication is ongoing, if a second wakeword-detection component determines that second audio data includes a representation of a second wakeword, the second audio data is not send to a corresponding second speech-processing system.

20 Claims, 21 Drawing Sheets

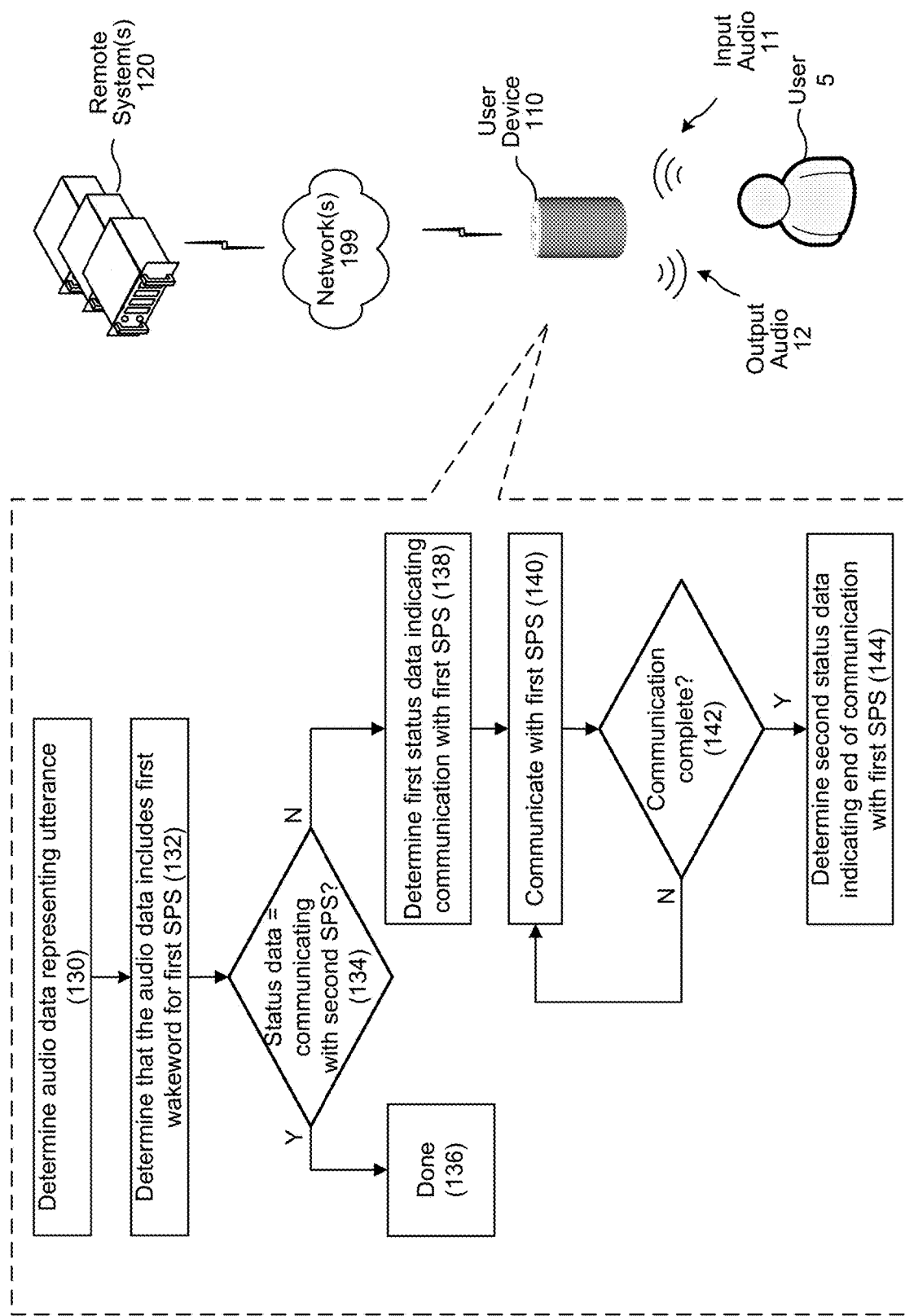

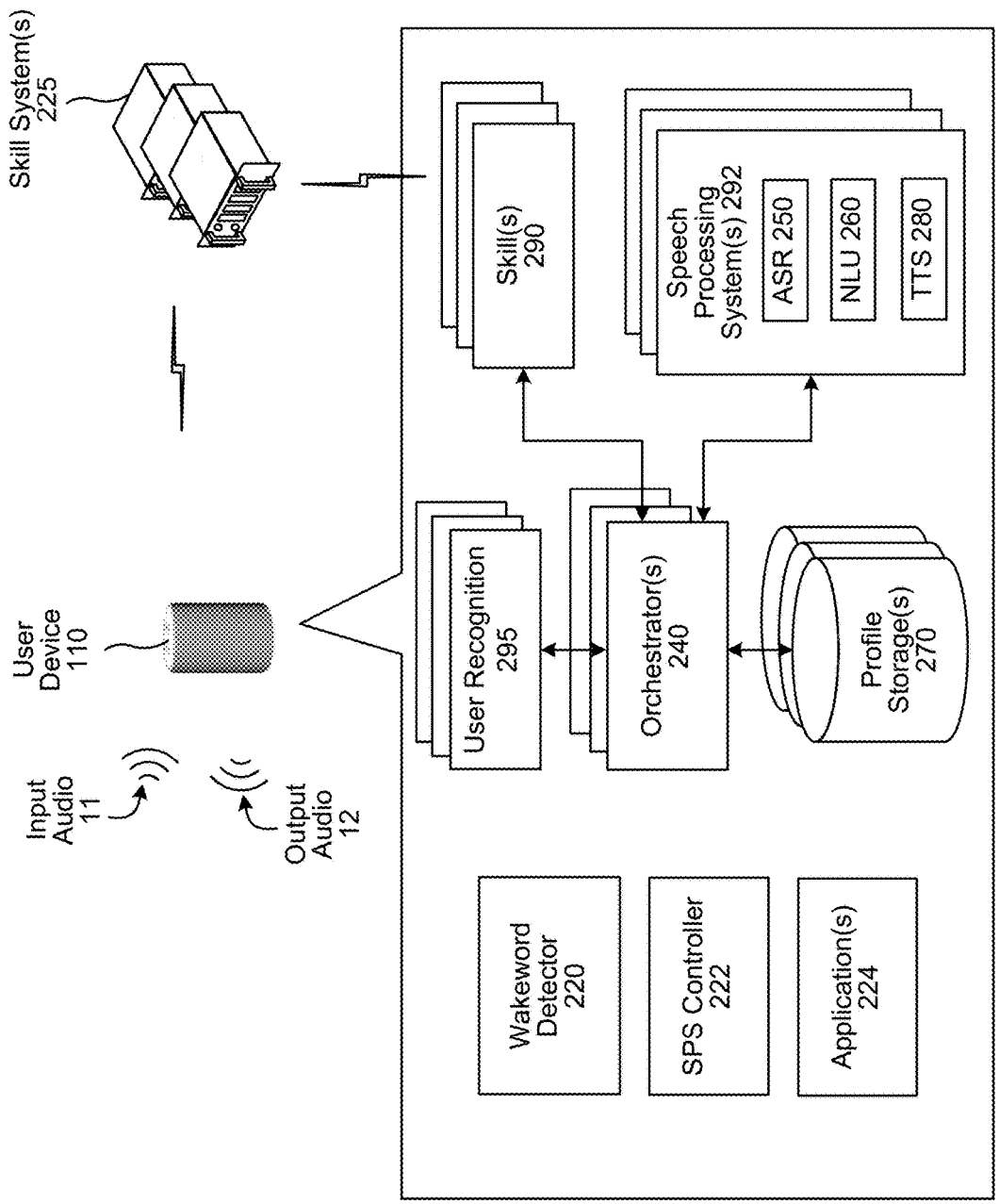

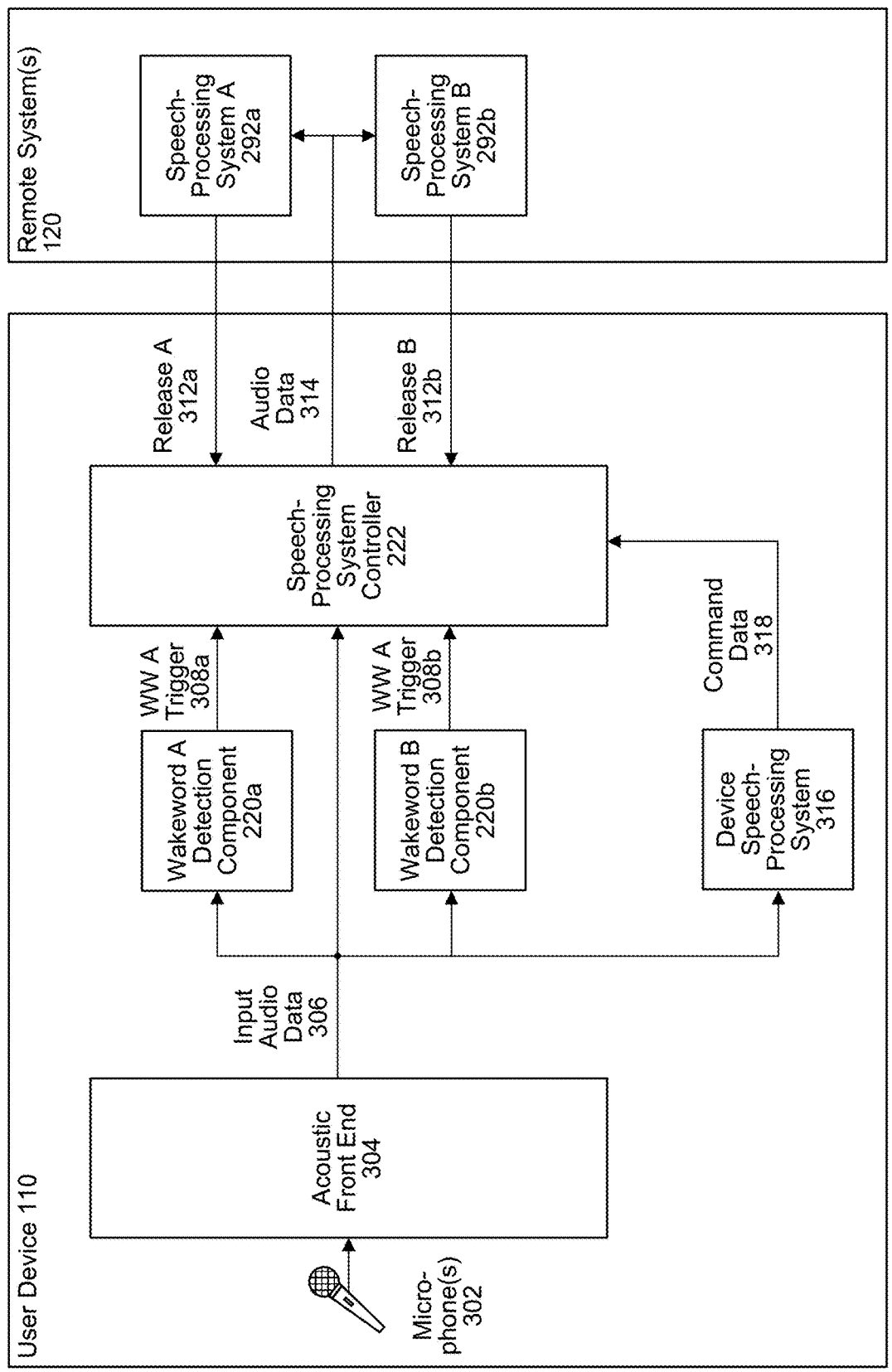

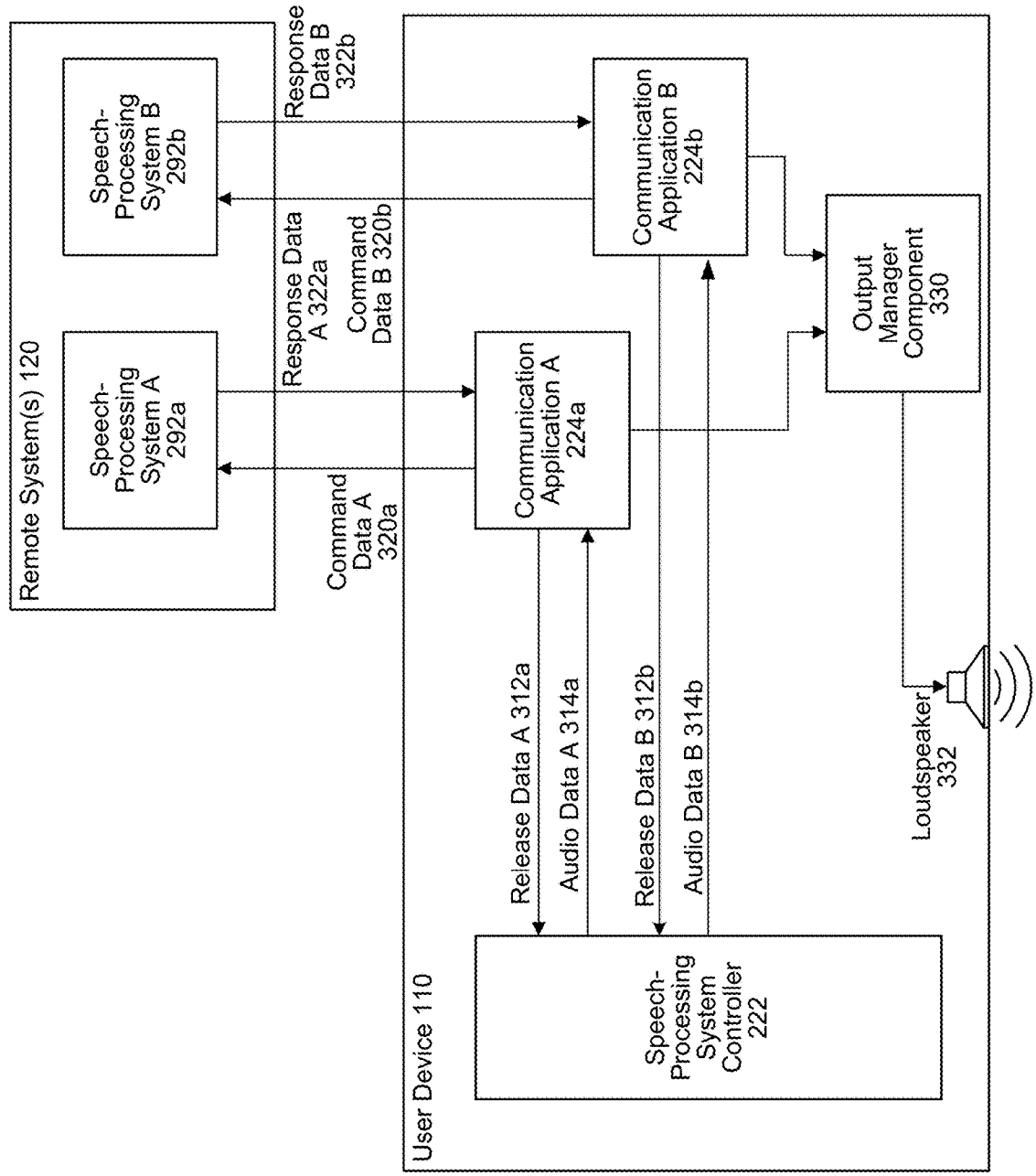

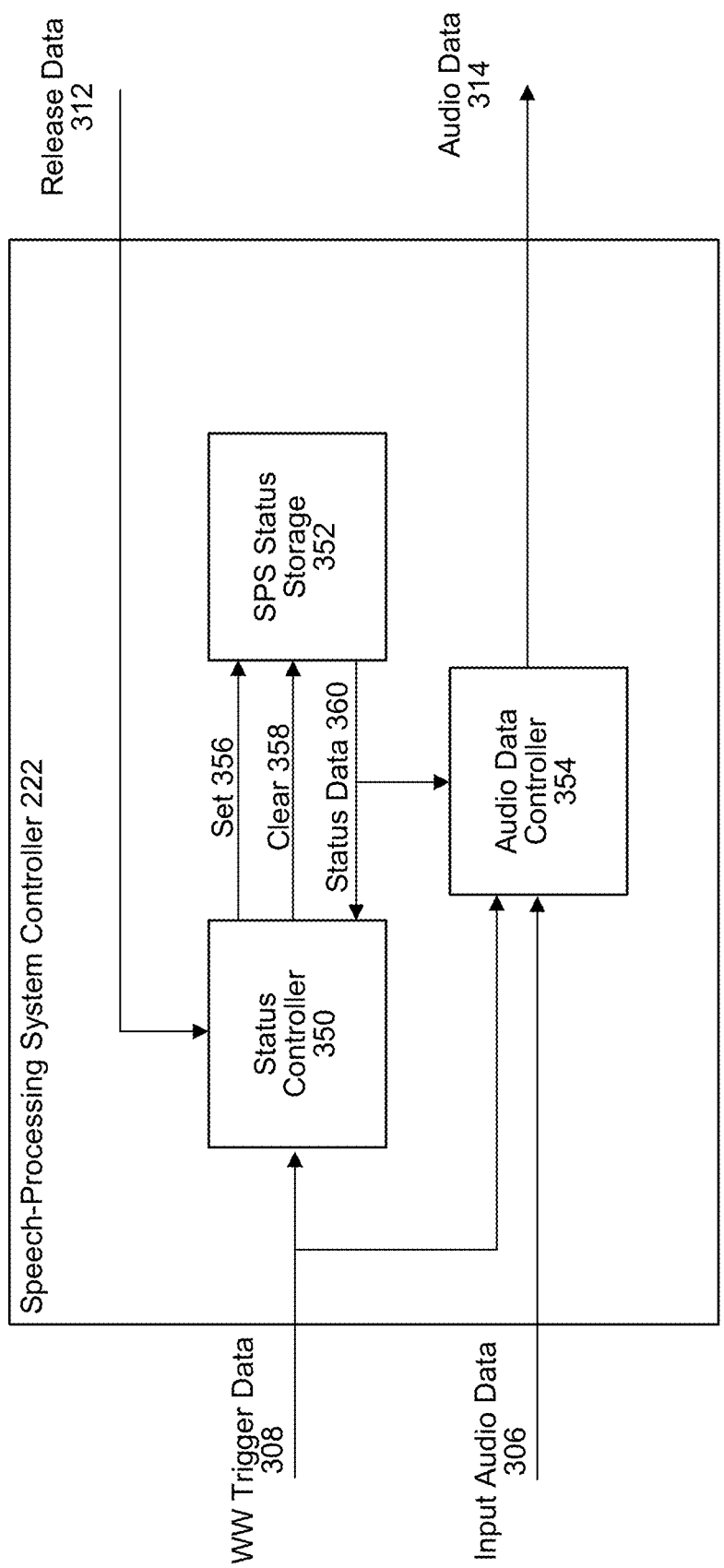

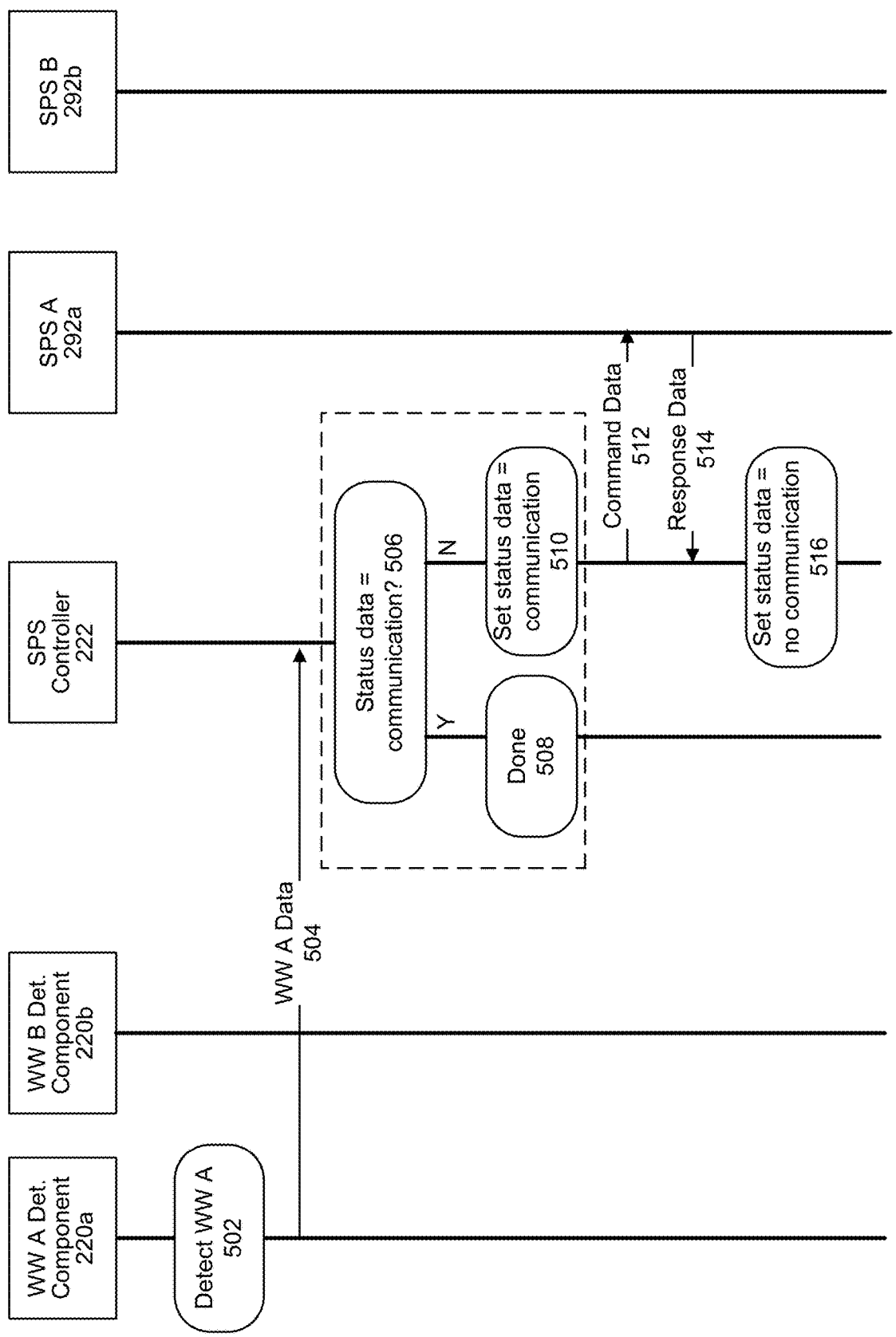

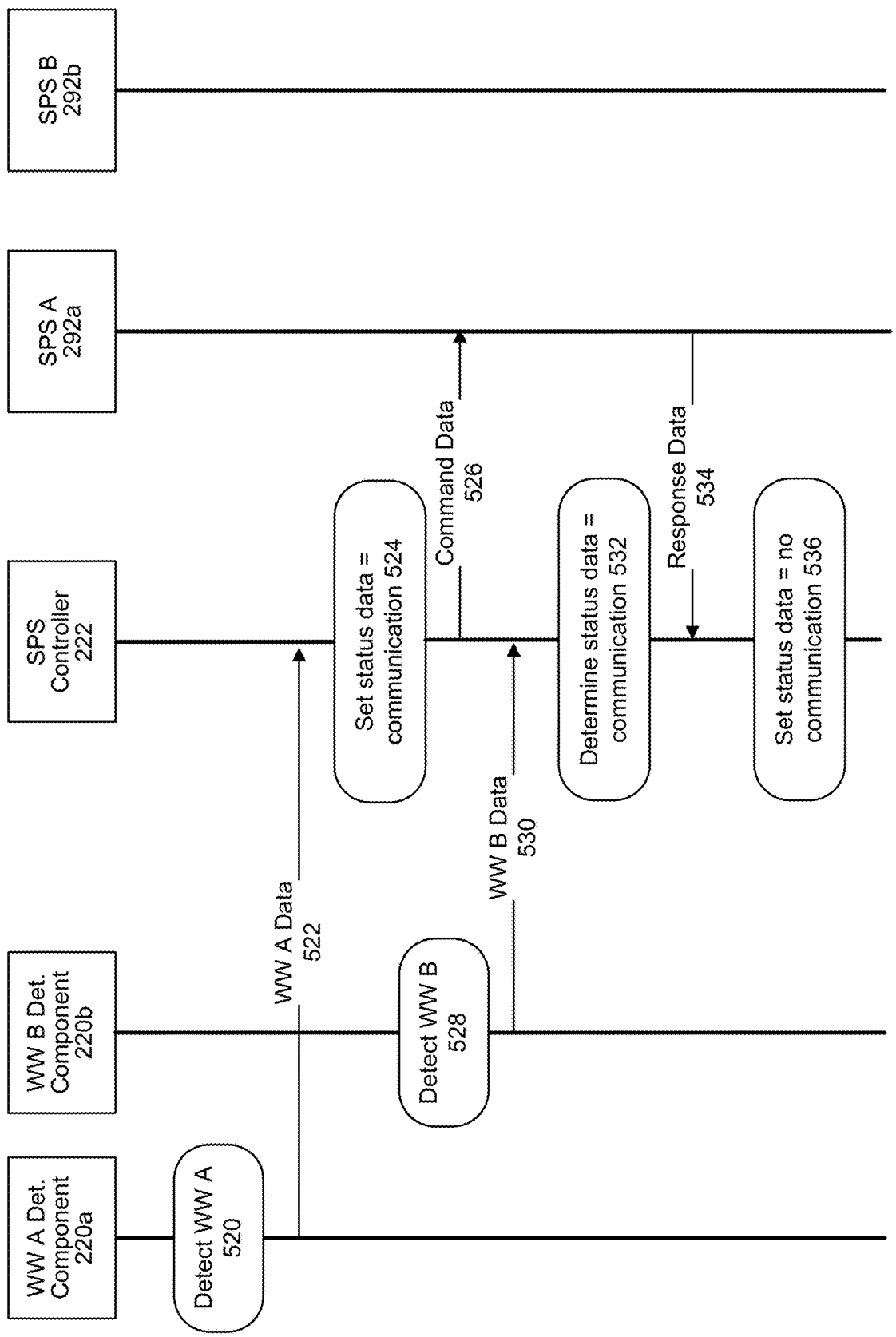

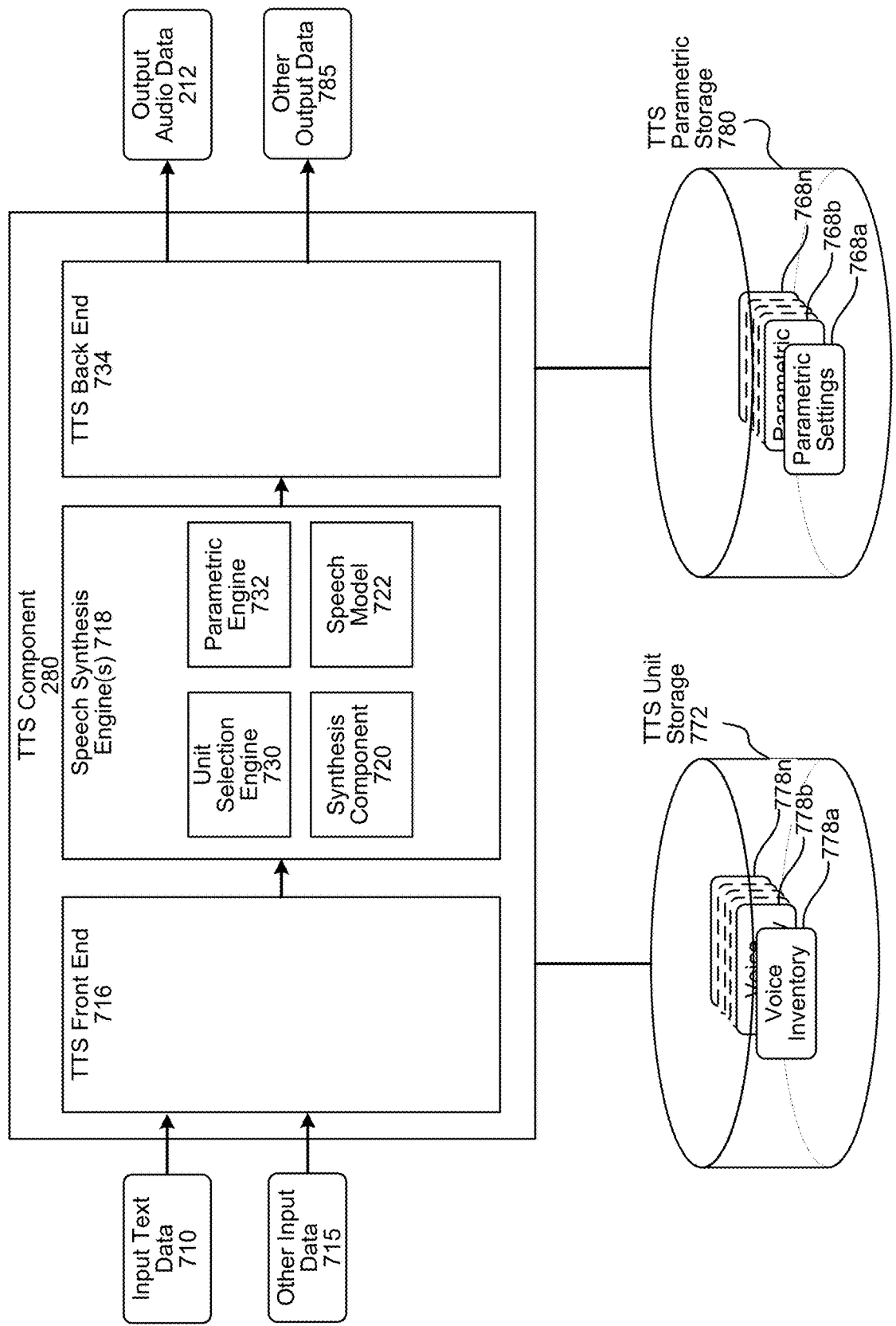

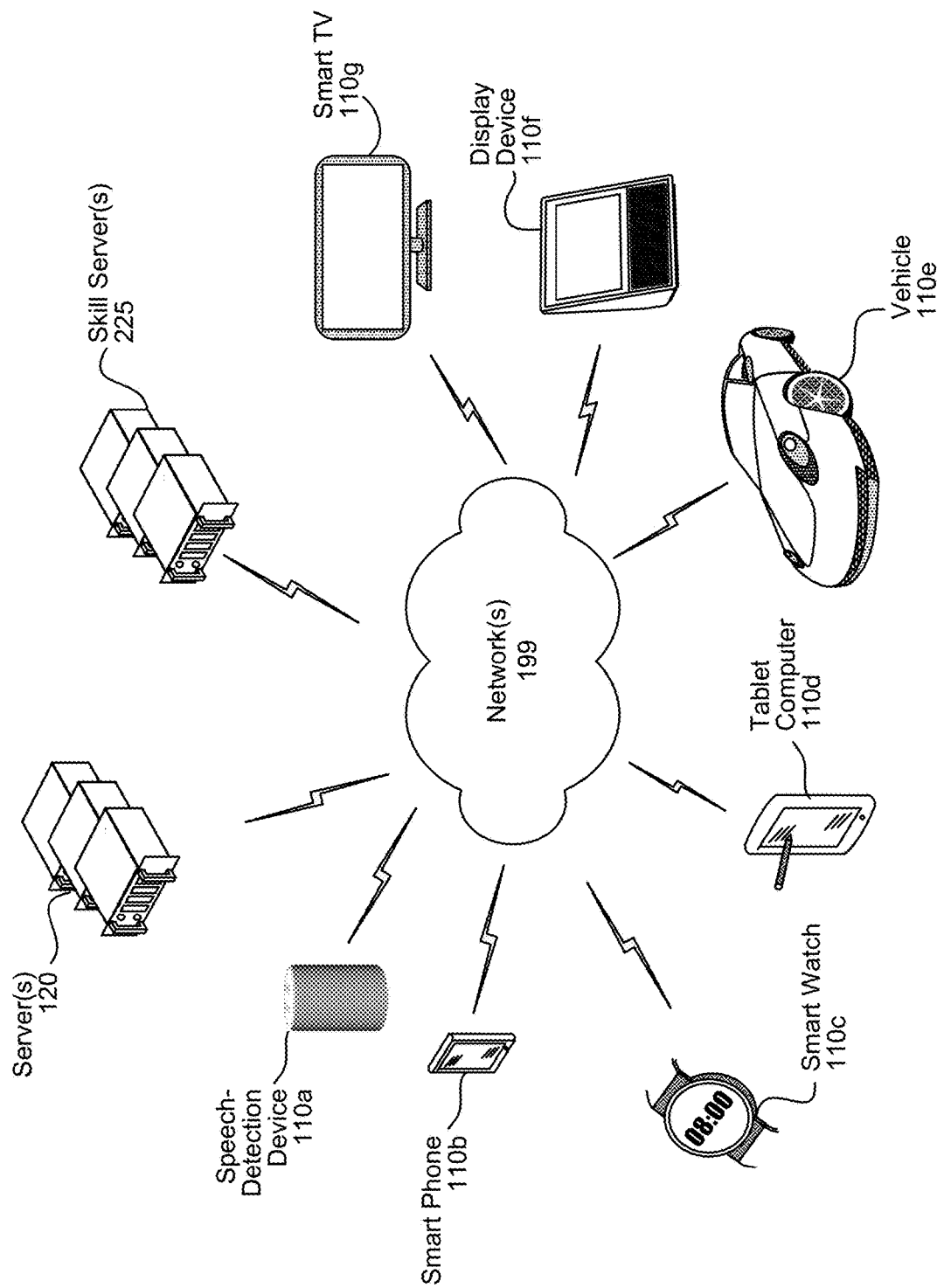

SPEECH-PROCESSING SYSTEM

BACKGROUND

Speech-processing systems allow users to control computing devices using their speech. These systems identify words spoken by a user based on properties of received audio data that represents the speech of the user. Automatic speech-recognition (ASR) processing combined with natural-language understanding (NLU) processing allows a speech-processing system to determine text corresponding to the speech and to understand a command expressed in the text. ASR processing and NLU processing may be combined with text-to-speech (TTS) processing, which may be used to generate synthesized speech responsive to the command. Speech processing may be used by computers, hand-held devices, smart speakers, and other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to process user input using speech-processing systems according to embodiments of the present disclosure.

FIGS. 2B and 2C illustrate a user device configured for speech processing according to embodiments of the present disclosure.

FIGS. 3A-3E illustrate speech-processing system controllers according to embodiments of the present disclosure.

FIGS. 5A and 5B illustrate methods of processing speech according to embodiments of the present disclosure.

FIG. 7 illustrates text-to-speech processing components according to embodiments of the present disclosure.

FIG. 11 illustrates an example of a computer network for use with a speech-processing system.

DETAILED DESCRIPTION

Figure 2A:
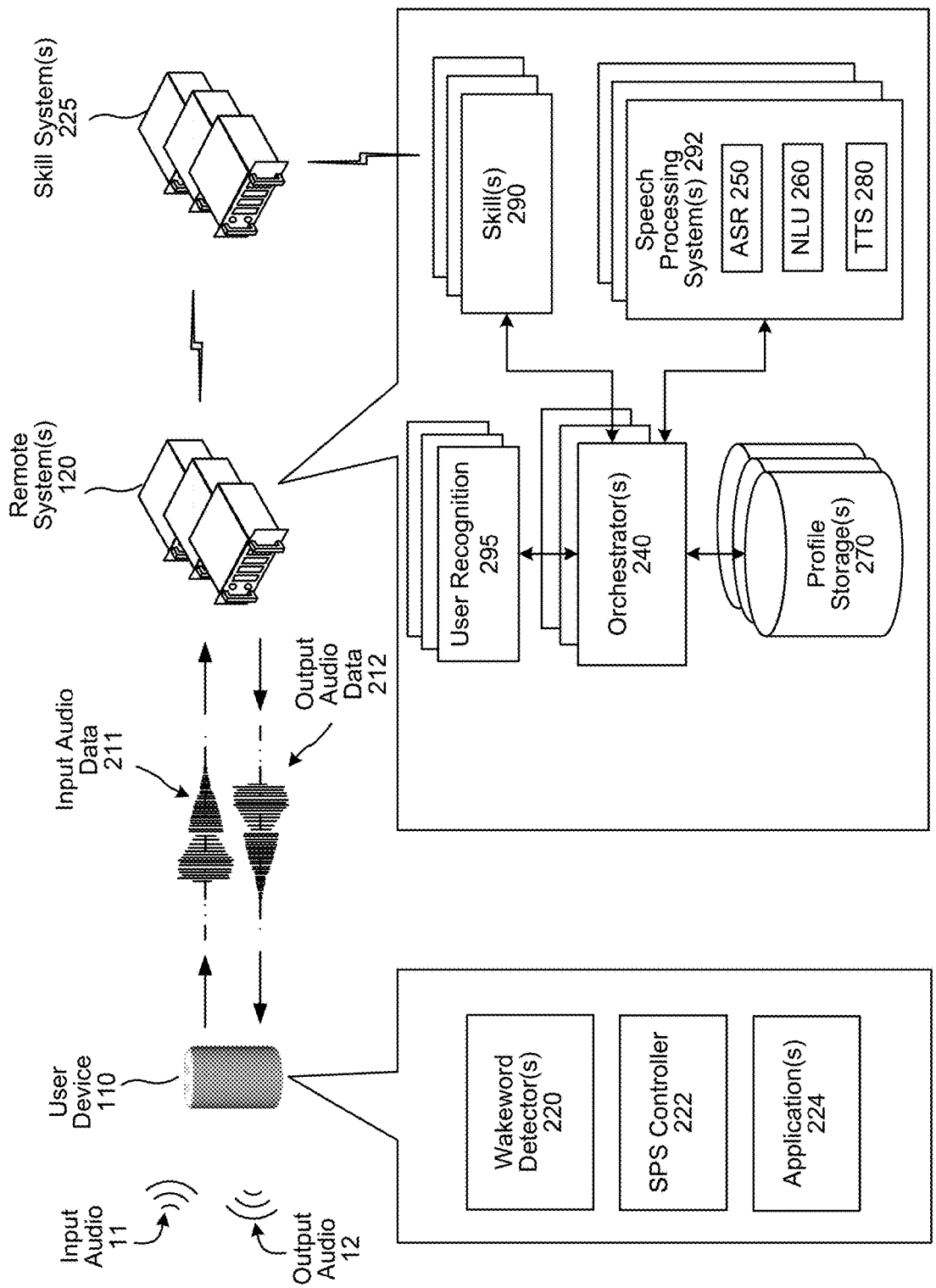
FIG. 2A illustrates a user device and a remote system configured for speech processing according to embodiments of the present disclosure.

Automatic-speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Text-to-speech (TTS) is a field of computer science, artificial intelligence, and linguistics that relates to enabling computers to convert a representation of text into audio representing synthesized speech. ASR, NLU, and/or TTS may be used together as part of a natural-understanding system, which may also be referred to as a speech-processing system.

A voice-controlled user device and/or a remote system may be configured to receive a spoken user input and, using ASR or other techniques, detect a wakeword and/or other text in the user input; using NLU, determine a command in the user input; and, using TTS and/or other user interface, provide a response to the command. A user may thus control the voice-controlled user device, another user device, and/or remote system by voice. In some embodiments, in response to the user device detecting the wakeword, the user device may send audio data, representing the user input, to the remote system for further processing. The remote system may further process the audio data to verify that it includes a representation of the wakeword and/or to determine the command and/or response. The user device may then receive, from the remote device, output audio, video, or other data related to the response and/or other data required to perform an action associated with the response.

The voice-controlled user device and/or remote system may process user input using two or more speech-processing systems, each of which may have its own ASR component(s), NLU component(s), and/or TTS component(s). Each speech-processing system may be associated with commands and/or responses to those commands unique to that speech-processing system. For example, a first speech-processing system may be preferred by a user for online shopping, while a second speech-processing system may be preferred for navigation. A user may thus wish to direct online-shopping commands to the first speech-processing system and wish to direct navigation commands to the second speech-processing system. The first speech-processing system may be unable to fulfill some or all commands associated with the second speech-processing system, and vice versa. Both speech-processing systems may, however, be capable of fulfilling other commands.

Each speech-processing system may further be associated with a different wakeword. A first speech-processing system may, for example, be associated with the wakeword "Alexa." The user device and/or remote system may be configured to use a particular speech-processing system upon detection of its associated wakeword. The user device and/or remote system may include two or more components that each recognize a different wakeword. For example, a first wakeword associated with a first speech-processing system may be "Alexa," while a second wakeword associated with a second speech-processing system may be "Computer." In this example and throughout the present disclosure, the wakewords "Alexa" and "Computer" are used as examples; the present disclosure is not, however, limited to only these wakewords. Further, in certain situations one speech processing system may be triggered with one set of wakewords and another speech processing system may be triggered with a different set of wakewords.

In some situations, the user input includes a representation of the first wakeword associated with a first speech-processing system and a representation of a command the user intends to be processed by the first speech-processing system. The user input may, however, also include a representation of the second wakeword and/or a representation of sounds that resemble the second wakeword. For example, if the wakewords are "Alexa" and "Computer," the user input may correspond to "Alexa, turn on the computer in my office." In this example, a first wakeword-detection component may detect the wakeword "Alexa" and cause the sending of corresponding audio data to a first speech-processing system associated with that wakeword. A second wakeword-detection component may, however, detect the word "computer" and improperly cause the sending of corresponding audio ("in my office") to a second speech-processing system associated with that wakeword.

FIG. 1 illustrates a system that includes a speech-processing system controller configured to control if and when audio data is sent to various speech-processing systems in accordance with the present disclosure. Although the figures and discussion of the present disclosure illustrate certain operational steps of the system in a particular order, the steps described may be performed in a different order (as well as certain steps removed or added) without departing from the intent of the disclosure. In various embodiments, a user device 110 such as smart speaker, a vehicle, or other such voice-controlled device communicates with a remote system 120 using a network 199. The user device may receive input audio 11 from a user 5 and output corresponding output audio 12. While FIG. 1 illustrates a smart speaker as the user device 110, the disclosure is not limited thereto, and the systems and methods described herein may be implemented using other user devices 110, such as smartphones, tablet computers, personal computers, or other devices. Further, while the figures illustrate audio being captured by device 110, audio may be captured by another device prior to being sent to device 110. For example, audio may be captured by a headset, headphones, earbuds, separate microphone array or the like and audio data sent from those device(s) to device 110 for processing as described herein.

The user device 110 determines (130) audio data representing an utterance spoken by a user. The utterance may include a wakeword portion and a query/command portion. The user device 110 may, for example, determine audio data corresponding to input audio 11. To accomplish this determination, the user device 110 may capture audio using one or more microphones and create corresponding audio data, which may be a time-domain digital representation of amplitudes of the audio and which may be represented as a series of samples. The user device 110 may process this time-domain audio data to create processed audio data; this processing may, for example, include performing one or more Fourier transforms, such as a fast Fourier transform (FFT) and/or grouping samples of audio data into frames of audio data. The processing may further include performing acoustic echo cancellation (AEC), active noise cancellation (ANC), or other such processing.

The user device 110 may include two or more wakeword detectors 220 (as explained in greater detail below with respect to FIGS. 2A-2C) that process the frames of audio data to determine (132) if a wakeword is represented therein. For example, a first wakeword detector may determine that the frames of audio data include a representation of a first wakeword, a second wakeword detector may determine that other frames of audio data include a representation of a second wakeword, and so on. The input audio data 211 may include a representation of the wakeword and/or a representation of other words than include the command.

A speech-processing system controller 222 may receive one or more outputs of one or more wakeword detectors 220 that indicate that a given wakeword detector 220 has detected the representation of the corresponding wakeword. For example, a first wakeword detector may send, to the speech-processing system controller 222, data indicating detection of the first wakeword. The first wakeword may be associated with a first speech-processing system 292.

Before sending corresponding audio data to the first speech-processing system 292a, however, the speech-processing system controller 222 may first determine if first status data indicates (134) that the device 110 is communicating with a second speech-processing system 292b. This communication may include sending, to the second speech-processing system 292b, first audio data, receiving, from the second speech-processing system 292b, second audio data, and/or waiting for a response from the second speech-processing system 292b. The communication may be initiated by a preceding detection of the second wakeword in other audio data and the sending of corresponding audio data to the second speech-processing system 292b. In other words, continuing the example above, the detection of the first wakeword may be the detection of the word "computer" in the utterance, "Alexa, turn on the computer in my office."

If the status data indicates communication with the second speech-processing system 292a, the user device 110 is done (136) processing the audio data with respect to the first speech-processing system 292a, and no further action is taken with respect to the first speech-processing system 292a regarding the audio data. In other words, because the second speech-processing system 292b is already processing corresponding audio data regarding the utterance, the user device 110 does not cause the first speech-processing system 292a to also process the audio data.

If, however, the status data indicates that the user device 110 is not communicating with the second speech-processing system 292b, the speech-processing system controller 222 may determine (138) first status data indicating that the device 110 is communicating with the first speech-processing system 292a. As explained in greater detail herein, this determination may include the setting of a flag or semaphore bit, in which setting the flag (e.g., setting the bit to binary 1) indicates that the device 110 is communicating with a speech-processing system 292.

The device 110 may then communicate (140) with the first speech-processing system 292a. This communication may include sending audio data from the device to the first speech-processing system 292a (via, in some embodiments, an orchestrator component 240 described in greater detail in FIGS. 2A-2C). The communication may further include receiving audio data from the first speech-processing system 292a; this audio data may be responsive to a command represented in the sent audio data, such as a response to a command. The communication may further include waiting, by the user device 110, for the response from the first speech-processing system 292a.

The device 110 may determine (142) that the communication is complete. This determination may include receiving, from the first speech-processing system 292a, an indication of completion, such as release data indicating that no further communication related to the detection of the first wakeword is required. The determination may instead or in addition include determining that a certain amount of time has passed since sending the audio data to the first speech-processing system 292a and/or a certain amount of time has passed since last receiving audio data from the first speech-processing system 292a.

Upon making this determination, the speech-processing system controller 222 may determine (144) second status data indicating the end of the communication. Upon determining this second status data, if and when the first wakeword-detection component again determines that additional audio data includes another representation of the wakeword, the speech-processing system controller 222 may cause sending of corresponding audio data to the first speech-processing system 292a (e.g., because the user device 110 is no longer communicating with the second speech-processing system).

Figure 2C:
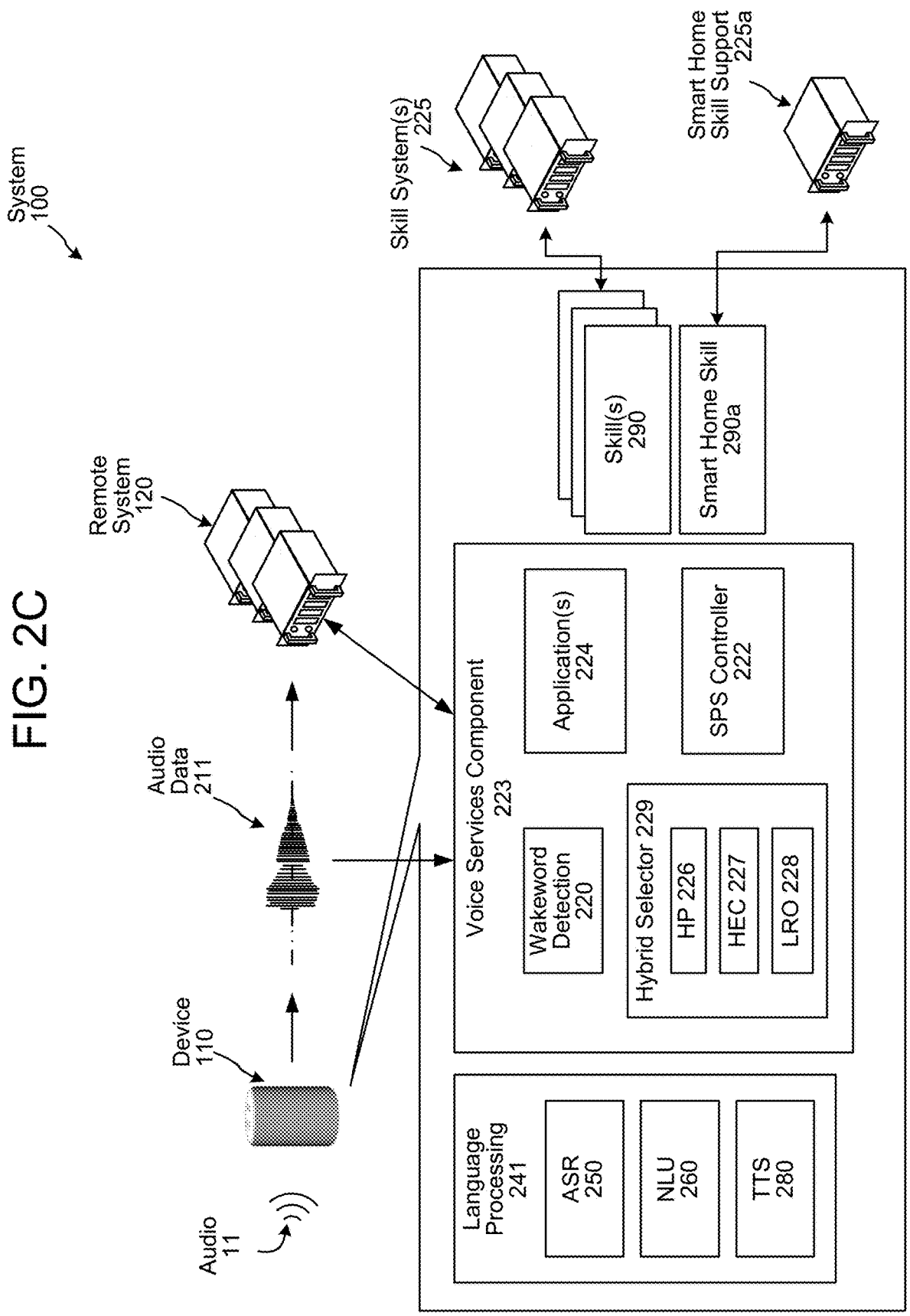

The system may operate using various components as described in FIGS. 2A-2C. The various components may be located on same or different physical devices. For example, as shown in FIG. 2A, some components may be disposed on a user device 110, while other components may be disposed on a remote system 120; as shown in FIGS. 2B and 2C, however, the components may be disposed on the user device 110. Communication between various components may occur directly (via, e.g., a bus connection) or across a network(s) 199. As described in greater detail below, the user device 110 may include a wakeword detector 220 for detecting one or more wakewords, a speech-processing system controller 222 for determining when and if audio data should be sent to a speech-processing system, and/or one or more applications 224 for providing output and/or changing a state of the user device 110, such as illuminating a light. As illustrated, the wakeword detector 220 is disposed on the user device 110, while further speech-processing components (such as the NLU component 260) are disposed on the remote system 120. The present disclosure is not, however, limited to only this arrangement of components, and any other disposition of components is within the embodiments of the present disclosure. For example, some or all of the speech processing may be performed by the user device 110, and the user device 110 may thus not send any audio data 211 to the remote system 120.

For example, FIG. 2C is a block diagram illustrating another embodiment of system 100 including a device 110 that is capable of performing speech processing. Optimizing the utilization of on-device computing resources (e.g., processing resources, etc.) of the device 110 can a reduce latency so that the user experience with the device 110 is not negatively impacted by local processing tasks taking too long.

While certain configurations of devices 110 may include speech processing system configurations as shown in FIG. 2B, some of the devices 110 may include a hybrid speech interface as shown in FIG. 2C. As shown in FIG. 2C, a device 110 may include a local speech processing component, such as a language processing component 241. As the device 110 includes the local language processing component 241, the device 110 may be configured to process audio data locally and/or send the audio data to the remote system 120 for remote processing. In certain examples, the device 110 may send audio data 211 to the remote system 120 for processing while also attempting to process the audio data 211 using the systems of device 110.

While FIG. 2C illustrates the language processing component 241 as including an ASR component 250 and/or an NLU component 260, the disclosure is not limited thereto and the language processing component 241 may include a spoken language understanding (SLU) component without departing from the disclosure. For example, the SLU component may be configured to receive audio data as an input and generate NLU data as an output, similar to the combination of the ASR component 250 and the NLU component 260.

The device 110 may be located within an environment to provide various capabilities to a user 5, when the user 5 is also in the environment. The environment in which the device 110 is located may be a home or other premises, an automobile, or any similar environment. Such an environment may include other devices including additional devices 110, such as other speech interface devices 110 (e.g., primary devices), and/or secondary devices (e.g., Internet of Things (IoT) devices and/or smart home devices like thermostats, lights, refrigerators, ovens, etc.) that may be controllable by devices 110. When acting as a hub, the device 110 may be configured to connect a plurality of devices 110 in an environment and control communications among them, thereby serving as a place of convergence where data arrives from one or more devices 110, and from which data is sent to one or more devices 110.

As noted, the device 110 may be configured to compare the audio data 211 to stored models used to detect a wakeword (e.g., "Alexa") that indicates to the device 110 that the audio data 211 is to be processed for determining a local NLU result (e.g., slot data that corresponds to a named entity, label data, and/or intent data, etc.). In some embodiments, the hybrid request selector 229 (further discussed below) may send the audio data 211 to a wakeword detection component 220, which determines whether a wakeword is detected in the audio data 211, and, if a wakeword is detected, this indication may be provided to the hybrid request selector 229 so that the hybrid request selector 229 can route the audio data 211 to the remote system 120 and/or the local language processing component 241 (e.g., the remote system 120 and the local language processing component 241 may process the audio data 211 in parallel, although the disclosure is not limited thereto). If a wakeword is not detected in the audio data 211, this indication may be provided to the hybrid request selector 229 so that the hybrid request selector 229 can refrain from sending the audio data 211 to the remote system 120, and to prevent the local language processing component 241 from further processing the audio data 211, which does not include the wakeword. The audio data 211 can be discarded in this situation. If a wakeword is detected the audio data 211 may be processed by speech-processing system controller 222 as discussed herein.

The device 110 may also conduct its own speech processing using on-device language processing components 241, such as ASR 250 and NLU 260, similar to the manner discussed with regard to remote system 120. The device 110 may also have internally included or otherwise accessible other components such as skill(s) 290, smart home skill 290a, and/or other components capable of executing commands based on NLU results or other results determined by the device 110, user recognition component, user profile storage, or other components. As described with regard to FIGS. 2A-2B, the skill(s) 290 may communicate with skill support 225, while the smart home skill 290a may communicate with smart home skill support 290a, without departing from the disclosure.

The on-device language processing components, however, may not necessarily have the same capabilities as the speech processing components of the remote system 120. For example, the on-device language processing components may be more particularly configured to handle local-type speech commands, such as those controlling devices or components at a user's home. In such circumstances the on-device language processing may be able to more quickly interpret and execute a smart-home command, for example, than processing that involves the remote system 120. If a device 110 attempts to process a command for which the on-device language processing components are not necessarily best suited, the speech processing results obtained by the device 110 may indicate a low confidence or other metric indicating that the processing by the device 110 may not be as accurate as the processing done by the remote system 120.

A hybrid request selector 229 (or, hybrid request selector component 229) of the device 110 is shown as including a hybrid proxy (HP) 226 (or, hybrid proxy (HP) subcomponent 226), among other subcomponents. The HP 226 can be implemented as a layer within the voice services component 223 and may be configured to proxy traffic to/from the remote system 120. For example, the HP 226 may be configured to send messages to/from a hybrid execution controller (HEC) 227 (or, hybrid execution controller (HEC) subcomponent 227) of the hybrid request selector 229. For example, command/directive data received from the remote system 120 can be sent to the HEC 227 using the HP 226. The HP 226 may also be configured to allow audio data 211 to pass through to the remote system 120 while also receiving (e.g., intercepting) this audio data 211 and sending the received audio data to the HEC 227.

On-device language processing component 241 (sometimes referred to as a "speech processing component," or a "spoken language understanding (SLU) component") is configured to process audio data 211 representing user speech. In some embodiments, the hybrid request selector 229 may further include a local request orchestrator (LRO) 228 (or, local request orchestrator (LRO) subcomponent) of the hybrid request selector 229. The LRO 228 is configured to notify the local language processing component 241 about the availability of new audio data 211 that represents user speech, and to otherwise initiate the operations of the local language processing component 241 when new audio data 211 becomes available. In general, the hybrid request selector 229 may control the execution of the local language processing component 241, such as by sending "execute" and "terminate" events/instructions to the local language processing component 241. An "execute" event may instruct the local language processing component 241 to continue any suspended execution based on audio data 211 (e.g., by instructing the local language processing component 241 to execute on a previously-determined intent in order to generate a directive). Meanwhile, a "terminate" event may instruct the local language processing component 241 to terminate further execution based on the audio data 211, such as when the device 110 receives directive data from the remote system 120 and chooses to use that remotely-generated directive data.

Thus when audio data 211 is received by the voice services component 223, the HP 226 may allow the audio data 211 to pass through to the remote system 120 and the HP 226 may also input the audio data 211 to the on-device language processing component 241 by routing the audio data 211 through the HEC 227 of the hybrid request selector 229, whereby the LRO 228 notifies the local language processing component 241 of the incoming audio data 211. At this point, the hybrid request selector 229 may wait for response data from either or both of the remote system 120 or the local language processing component 241. However, the disclosure is not limited thereto, and in other examples the hybrid request selector 229 may send the audio data only to the local language processing component 241 without departing from the disclosure. For example, the device 110 may process the audio data locally without sending the audio data to the remote system 120 without departing from the disclosure.

The local language processing component 241 is configured to receive the audio data 211 from the hybrid request selector 229 as input, to recognize speech in the audio data 211, to determine user intent from the recognized speech, and to determine how to act on the user intent by generating NLU results data which may include directive data (e.g., data instructing a component to perform an action). Such NLU results data may take a form similar to that as determined by the NLU operations by the remote system 120. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the local language processing component 241 (and/or the remote system 120) may be formatted using Java, such as JavaScript syntax, or JavaScript-based syntax. This may include formatting the directive using JSON. In some embodiments, a device-generated directive may be serialized, much like how remotely-generated directives are serialized for transmission in data packets over the network(s) 199. In other embodiments, a device-generated directive is formatted as a programmatic API call with a same logical operation as a remotely-generated directive. In other words, a device-generated directive may mimic remotely-generated directives by using a same, or a similar, format as the remotely-generated directive.

The language processing component 241 may process the audio data to determine local NLU data, which may include intent data and/or slot data (e.g., "NLU result") so that directives may be determined based on the intent data and/or the slot data. Thus, the language processing component 241 may process the audio data and attempt to make a semantic interpretation of the utterance represented by the audio data (e.g., determine a meaning associated with the utterance) and then implements that meaning. For example, the language processing component 241 may interpret audio data representing an utterance from the user 5 in order to derive an intent or a desired action or operation from the user 5. This may include deriving pertinent pieces of information from the utterance that allow the language processing component 241 to identify a second device in the environment, if the user, for example, intends to control a second device (e.g., a light in the user's 5 house). The local language processing component 241 may also provide a dialog management function to engage in speech dialogue with the user 5 to determine (e.g., clarify) user intents by asking the user 5 for information using speech prompts.

In some examples, the language processing component 241 outputs the most likely NLU response (e.g., hypothesis) recognized in the audio data, or multiple hypotheses in the form of a lattice or an N-best list with individual hypotheses corresponding to confidence scores or other scores (such as probability scores, etc.). In some examples, the language processing component 241 is customized to the user 5 (or multiple users) who created a user account to which the device 110 is registered. For example, the language processing component 241 may process the audio data based on known information (e.g., preferences) of the user 5, and/or on a history of previous interactions with the user 5.

NLU results as determined by the device 110 and/or the remote system 120 may include data indicating a confidence and/or estimated accuracy of the results. Such data may come in the form of a numeric score but may also come in different forms such as an indicator of Low, Medium, or High, a ranking, or other data. The confidence data may be set to a similar scale so that confidence data for one set of NLU results (e.g., NLU result data from device 110) may be evaluated with regard to confidence data for another set of results (e.g., NLU result data from the remote system 120).

Thus an NLU result may be selected as a candidate NLU result usable to respond to the user speech, and the local language processing component 241 may send local response data (e.g., local NLU result and/or local directive data) to the hybrid request selector 229, such as a "Ready-ToExecute" response, which can indicate that the local language processing component 241 has recognized an intent, or is ready to communicate failure (e.g., if the local language processing component 241 could not recognize an intent). The hybrid request selector 229 may then determine whether to use directive data from the local language processing component 241 to respond to the user speech, to use directive data received from the remote system 120, assuming a remote response is even received (e.g., when the device 110 is able to access the remote system 120 over the network(s) 199), or to generate output audio requesting additional information from the user 5.

As can be appreciate, many different configurations of speech processing systems may be configured according to the present disclosure. For example, device 110 may be a smartphone, tablet, or other device that is capable of running certain components of multiple speech-processing systems 292. For example, device 110 may operate a first application corresponding to a speech-processing system 292*a* invoked by the wakeword "Alexa" and may operate a second application corresponding to a speech-processing system 292*b* invoked by the wakeword "Computer." Each application may be configured to perform certain processing on its own relative to its own speech processing operations. Alternatively or in addition, each application may be configured to communicate with its own back end server(s) 120 (e.g., 120*a* and 120*b*) for processing corresponding to the appropriate speech processing operations.

An audio capture component(s), such as a microphone or array of microphones of the user device 110, captures input audio 11 and creates corresponding input audio data 211. The wakeword detector 220 of the user device 110 may process the input audio data 211 to determine whether speech is represented therein. The user device 110 may use various techniques to determine whether the input audio data 211 includes speech. In some examples, a voice-activity detector of the user device 110 may apply voice-activity detection (VAD) techniques. Such VAD techniques may determine whether speech is present in audio data based on various quantitative aspects of the input audio data 211, such as the spectral slope between one or more frames of the audio data; the energy levels of the audio data in one or more spectral bands; the signal-to-noise ratios of the audio data in one or more spectral bands; or other quantitative aspects. In other examples, the user device 110 may include a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector 220 may determine that the input audio data 211 contains a representation of a wakeword (as described in greater detail below); the user device 110 may thereafter send the input audio data 211 to the system(s) 120. As described above, an example wakeword is "Alexa" or "Computer." The user device 110 may instead or in addition send the audio data to the system(s) 120 when an input detector detects an input—such as a key press, button press, or touch-screen touch. An example button is a "Push to Talk" button. In either event, the user device 110 sends the input audio data 211 to the server 120. A button or other physical input may function similarly to the WW trigger discussed herein. For example, if the device 110 detects pushing of a "push to talk" button, it may cause a WW trigger signal (such as 308 discussed below) to be sent to the speech-processing system controller 222. Similarly, different buttons may be available that cause different WW triggers to be generated and sent. For example, a first button may correspond to a first wakeword (e.g., "Alexa") while a second button may correspond to a second wakeword (e.g., "Computer"). If a press of the first button is detected a first WW trigger (corresponding to "Alexa") may be generated and sent, while if a press of the second button is detected a second WW trigger (corresponding to "Computer") may be generated and sent. Similarly, a single button may be configured to detect different touch types such as a short press, long press, single tap, double tap, etc. Thus if a first press type (e.g., short press, long press, single tap, double tap) of a button is detected a first WW trigger (corresponding to "Alexa") may be generated and sent, while if a second press type (e.g., short press, long press, single tap, double tap) of the button is detected a second WW trigger (corresponding to "Computer") may be generated and sent.

The wakeword detector 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 220 may be built on deep neural network (DNN)/recursive neural network (RNN) structures directly, without MINI being included. Such an architecture may estimate the posteriors of wakewords with context information, either by stacking frames within a context window for DNN or using RNN. Follow-on posterior threshold tuning or smoothing is applied for decision making.

Once the wakeword is detected by the wakeword detector 220 and/or input is detected by the input detector, the user device 110 may transmit the audio data 211 to the remote system(s) 120 in accordance with the operation of the speech-processing system controller 222, described in greater detail below with respect to FIGS. 3A-3E. The input audio data 211 may include data corresponding to the wakeword; in other embodiments, the portion of the audio corresponding to the wakeword is removed by the user device 110 prior to sending the input audio data 211 to the remote system(s) 120.

In various embodiments, the wakeword detector 220 may use one of a plurality of wakeword-detection models. Each model may be trained to detect a different wakeword. In some embodiments, a single model may detect multiple wakewords. Each wakeword may be associated with a different speech-processing system 292. Upon detection of a particular wakeword, the user device 110 may send the audio data 211 (and/or an indication of detection of the wakeword) to its corresponding speech-processing system.

The wakeword detector 220 may determine a similarity score for the candidate wakeword based on how similar it is to the stored wakeword; if the similarly score is higher than the wakeword-detection threshold, the wakeword detector 220 determines that the wakeword is present in the audio data, and if the similarity score is less than the wakeword-detection threshold, the wakeword detector 220 determines that the wakeword not is present in the audio data. For example, if the candidate wakeword matches the stored wakeword very closely, the wakeword detector 220 may determine a similarity score of 100; if the candidate wakeword does not match the stored wakeword at all, the wakeword detector 220 may determine a similarity score of 0. If the wakeword detector 220 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

The user device 110 may also use different wakewords for different skills within a same speech-processing system. Thus, the user device 110, using the techniques described herein, may process incoming audio to determine a first confidence that a detected wakeword is a first wakeword associated with a first speech-processing system (which may be a first speech processing component (e.g., skill, etc.) within the first speech-processing system) as well as determine a second confidence that the detected wakeword is a second wakeword associated with a second speech-processing system (which may be a second speech-processing system or a second, different, component (e.g., skill, etc.) within the second speech-processing system. The different systems may be associated with different ASR processing, different NLU processing, different TTS processing, different domains/intents, or other differences.

Upon receipt by the system(s) 120 and/or upon determination by the user device 110, the input audio data 211 may be sent to an orchestrator component 240. The orchestrator component 240 may include memory and logic that enables it to transmit various pieces and forms of data to various components of the system, as well as perform other operations as described herein. In some embodiments, a single orchestrator component 240 communicates with multiple speech-processing systems; in other embodiments, a first remote device 120 includes a first orchestrator component 240 for communication with a first speech-processing system 292, a second remote device 120 includes a second orchestrator component 240 for communication with a second speech-processing system, and so on. Other components of the remote device, such as a user-recognition component 295 and/or profile storage 270 (described in greater detail below) may be shared between speech-processing systems 292 or may be unique for each speech-processing system 292. One speech processing system 292a may be operated by one set of remote server(s)/system(s) 120 while another speech processing system 292b may be operated by another different set of remote server(s)/system(s) 120. In another embodiment speech processing system 292a may share certain remote server(s)/system(s) 120 with speech processing system 292b. Further, one speech processing system 292a may have separate components (such as 240, 290, 295, 270, 250, 260, 280, etc.) than speech processing system 292b or speech processing system 292a may share certain components (such as 240, 290, 295, 270, 250, 260, 280, etc.) with speech processing system 292b.

The orchestrator component 240 may be or include a speech-processing system manager and/or one or more of the speech-processing systems 292, which may be used to determine which, if any, of the ASR 250, NLU 260, and/or TTS 280 components should receive and/or process the audio data 211. In some embodiments, the orchestrator component 240 includes one or more ASR components 250, NLU components 260, TTS components 280, and/or other processing components, and processes the input audio data 211 before sending it and/or other data to one or more speech-processing components 292 for further processing. In other embodiments, the orchestrator component 240 sends the input audio data 211 to one or more of the speech-processing components 292 for processing.

As described above, the orchestrator component 240 (and/or one or more of the speech-processing systems 292) may determine that the input audio data 211 is associated with a first speech-processing system 292a (e.g., it contains representation of a wakeword associated with the first speech-processing system 292a or it does not contain a representation of any wakeword and the first speech-processing system 292a is selected by default). The wakeword detector 220 may, for example, detect presence of a particular wakeword and send an indication of the wakeword to the speech-processing system manager. Instead or in addition, the ASR component 250 may determine text data corresponding to the audio data 211 and send the text data to the speech-processing system manager, which may then determine that the wakeword is represented in the text.

The first speech-processing system 292a may control, have access to, or otherwise be associated with a first set of skills 290, applications, and/or speech styles, and the second speech-processing system 292b may control, have access to, or otherwise be associated with a second set of skills 290, applications, and/or speech styles. The first and second set of skills 290 may include common skills as well as skills exclusive to each speech-processing system 292. In some embodiments, a first speech-processing system 292a is a general-purpose speech-processing system and may provide such skills and applications as weather forecasts, restaurant reservations, shopping services, and Internet searches; a second speech-processing system 292b is a vehicle-specific speech-processing system and may provide such skills and applications as changing a state of the user device 110 (e.g., raising/lowering a window, setting a thermostat, and/or adjusting a seat) and/or providing diagnostic information. Some applications and skills may be common to both speech-processing systems 292 (e.g., playing music or providing navigation information). Any number of speech-processing systems 292, however, having any type of applications or skills is within the scope of the present disclosure.

In some embodiments, the orchestrator component 240 communicates with the speech-processing systems 292 using an application programming interface (API). The API may be used to send and/or receive data, commands, or other information to and/or from the speech-processing systems 292. For example, the orchestrator 240 may send, via the API, the input audio data 211 to a speech-processing system and may receive, from the selected speech-processing system 292, a command and/or data responsive to the audio data 211.

Each speech-processing system 292 may include an ASR component 250, which may transcribe the input audio data 211 into text data. The text data output by the ASR component 250 may represent one or more than one (e.g., in the form of an N-best list) ASR hypotheses representing speech represented in the input audio data 211. The ASR component 250 interprets the speech in the input audio data 211 based on a similarity between the audio data 211 and pre-established language models. For example, the ASR component 250 may compare the input audio data 211 with models for sounds (e.g., acoustic units such as phonemes, senons, phones, etc.) and sequences of sounds to identify words that match the sequence of sounds of the speech represented in the input audio data 211. The ASR component 250 sends the text data generated thereby to an NLU component 260, via, in some embodiments, the orchestrator component 240. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

Figure 6A:
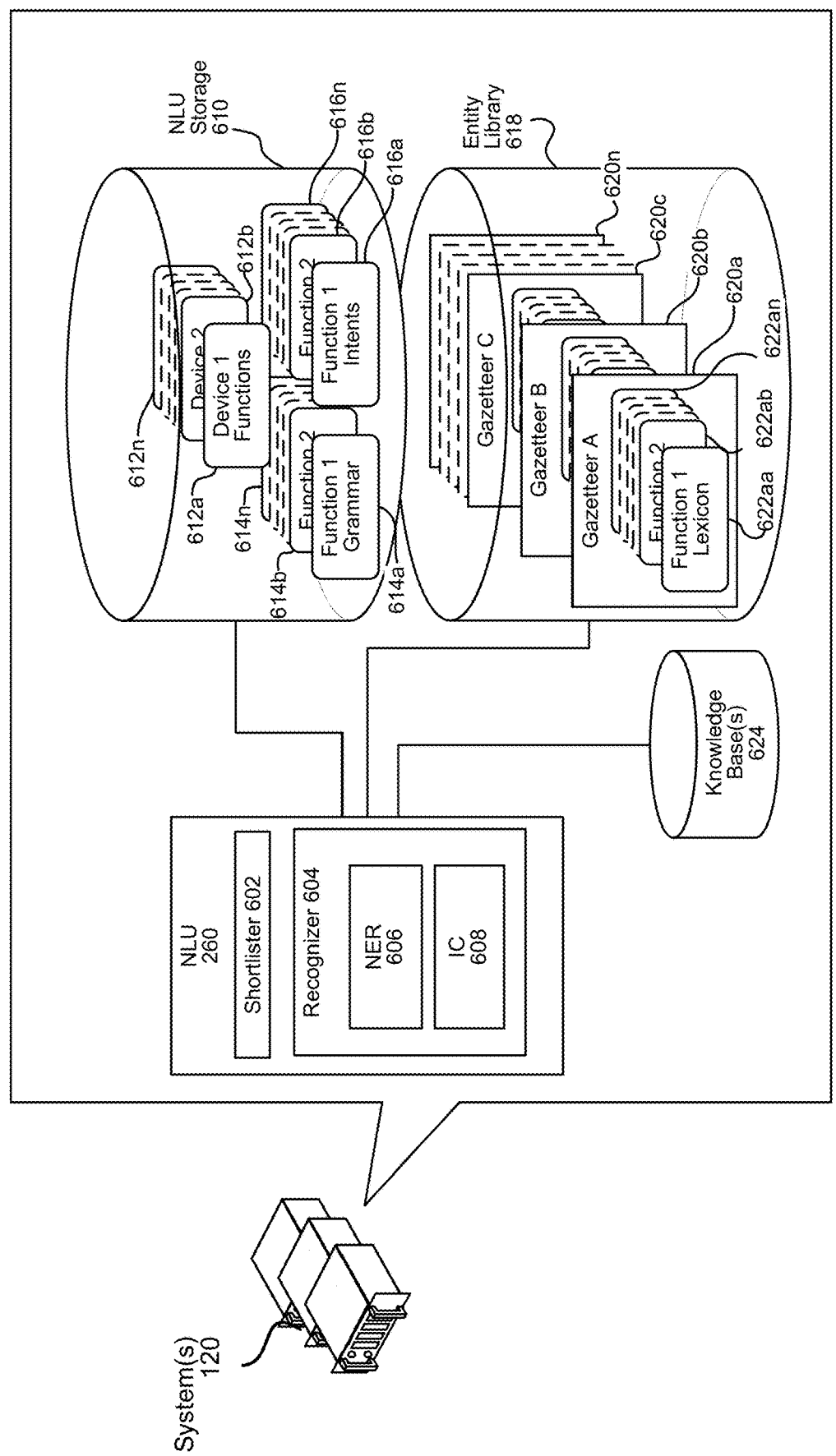
FIGS. 6A and 6B illustrate natural-language processing systems according to embodiments of the present disclosure.
Figure 6B:
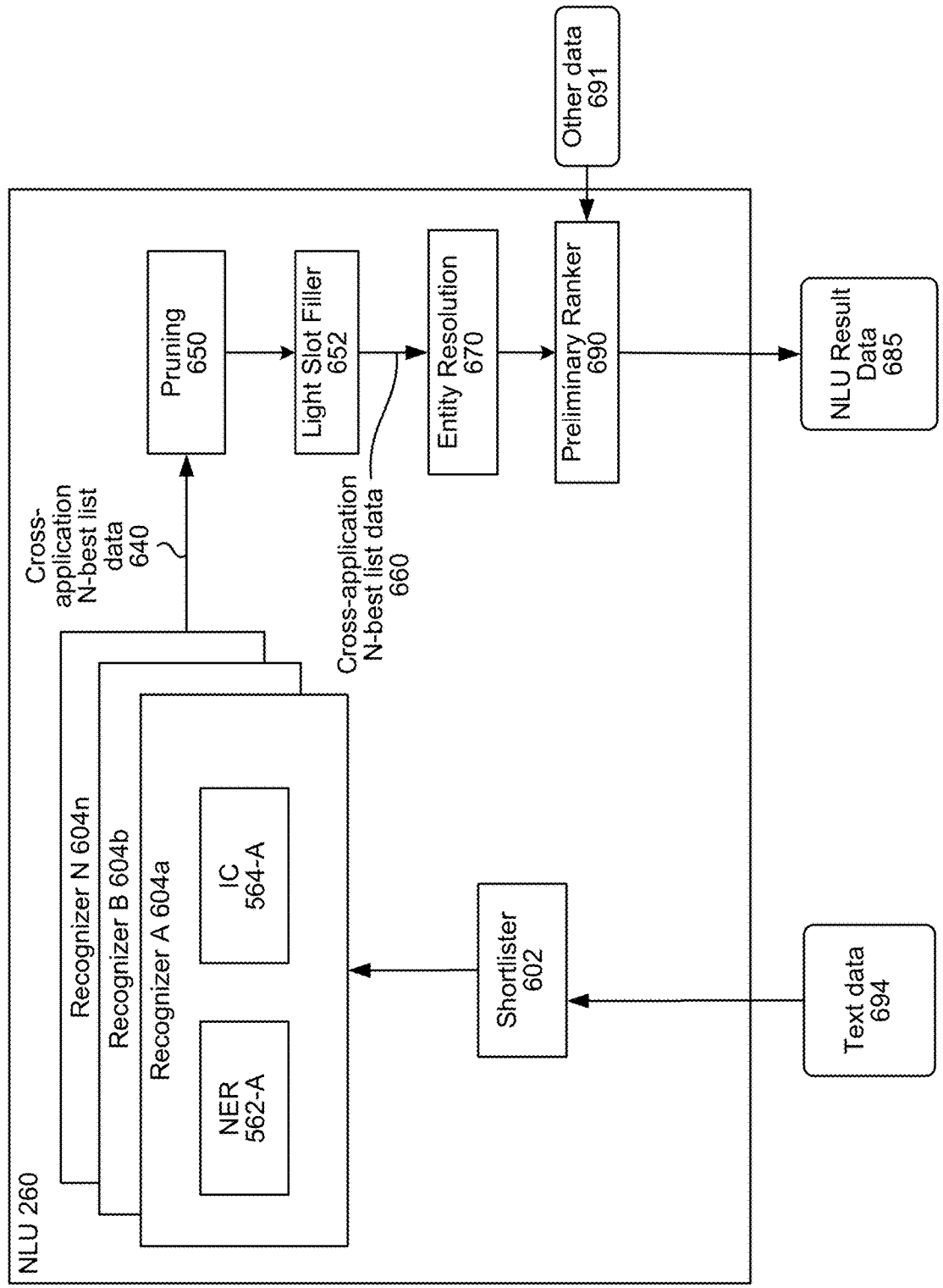

Each speech-processing system 292 may further include a NLU component 260, which is shown in greater detail in FIGS. 6A and 6B, that determines a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the user device 110, the system(s) 120, a skill component 290, a skill system(s) 225, etc.) to execute the intent. For example, if the text data corresponds to "play Africa by Toto," the NLU component 260 may determine an intent that the system output music and may identify "Toto" as an artist and "Africa" as the song. For further example, if the text data corresponds to "what is the weather," the NLU component 260 may determine an intent that the system output weather information associated with a geographic location of the user device 110. In another example, if the text data corresponds to "turn off the lights," the NLU component 260 may determine an intent that the system turn off lights associated with the user device 110 or the user 5.

The NLU results data may be sent (via, for example, the orchestrator component 240) from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top scoring NLU hypothesis. As described above, the NLU component 260 and/or skill component 290 may determine, using the interaction score, text data representing an indication of a handoff from one speech-processing system 292 to another.

A skill component 290 may be software running on the system(s) 120 that is akin to a software application. That is, a skill component 290 may enable the system(s) 120 to execute specific functionality in order to provide data or produce some other requested output. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the user device 110, in order to complete certain functions.

Inputs to a skill component 290 may come from speech processing interactions or through other interactions or input sources. A skill component 290 may include hardware, software, firmware, or the like that may be dedicated to a particular skill component 290 or shared among different skill components 290.

A skill system(s) 225 may communicate with a skill component(s) 290 within the system(s) 120 directly and/or via the orchestrator component 240. A skill system(s) 225 may be configured to perform one or more actions. A skill may enable a skill system(s) 225 to execute specific functionality in order to provide data or perform some other action requested by a user. For example, a weather service skill may enable a skill service(s) 225 to provide weather information to the system(s) 120, a car service skill may enable a skill system(s) 225 to book a trip with respect to a taxi or ride sharing service, an order pizza skill may enable a skill system(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system(s) 120 may include a skill component 290 dedicated to interacting with the skill system(s) 225. A skill, skill device, or skill component may include a skill component 290 operated by the system(s) 120 and/or skill operated by the skill system(s) 225.

Each speech-processing system 292 may include a TTS component 280, which is shown in greater detail in FIG. 7, that generates audio data (e.g., synthesized speech) from text data using one or more different methods. Text data input to the TTS component 280 may come from a skill component 290, the orchestrator component 240, and/or another component of the system. The text data may include an indication of a speech-processing component and/or data responsive to a command.

Figure 8:
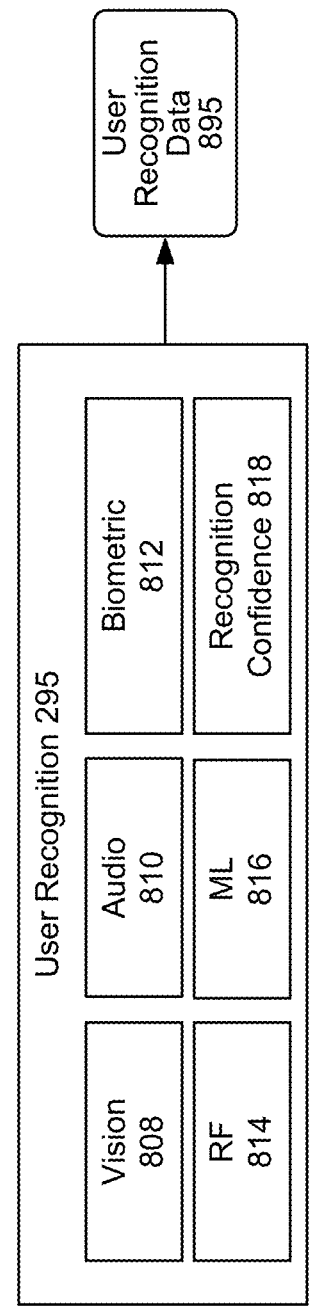
FIG. 8 illustrates a user-recognition component according to embodiments of the present disclosure.

The system(s) 120 may include a user-recognition component 295, which is shown in greater detail in FIG. 8, that recognizes one or more users associated with data input to the system. The user-recognition component 295 may take as input the audio data 211 and/or text data output by the ASR component 250. The user-recognition component 295 may perform user recognition by comparing audio characteristics in the input audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system. As described above, the interaction determination component 296 may use this user identifier to identify a user account in the profile storage 270.

The system(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a user device 110, the user profile (associated with the presented login information) may be updated to include information about the user device 110. As described, the profile storage 270 may further include data that shows an interaction history of a user, including commands and times of receipt of commands. The profile storage 270 may further include data that shows when a second user was present to hear an indication of a handoff for a command uttered by a first user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As described above, these permissions may include a grant (or denial) to use a particular speech-processing system 292. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3A:
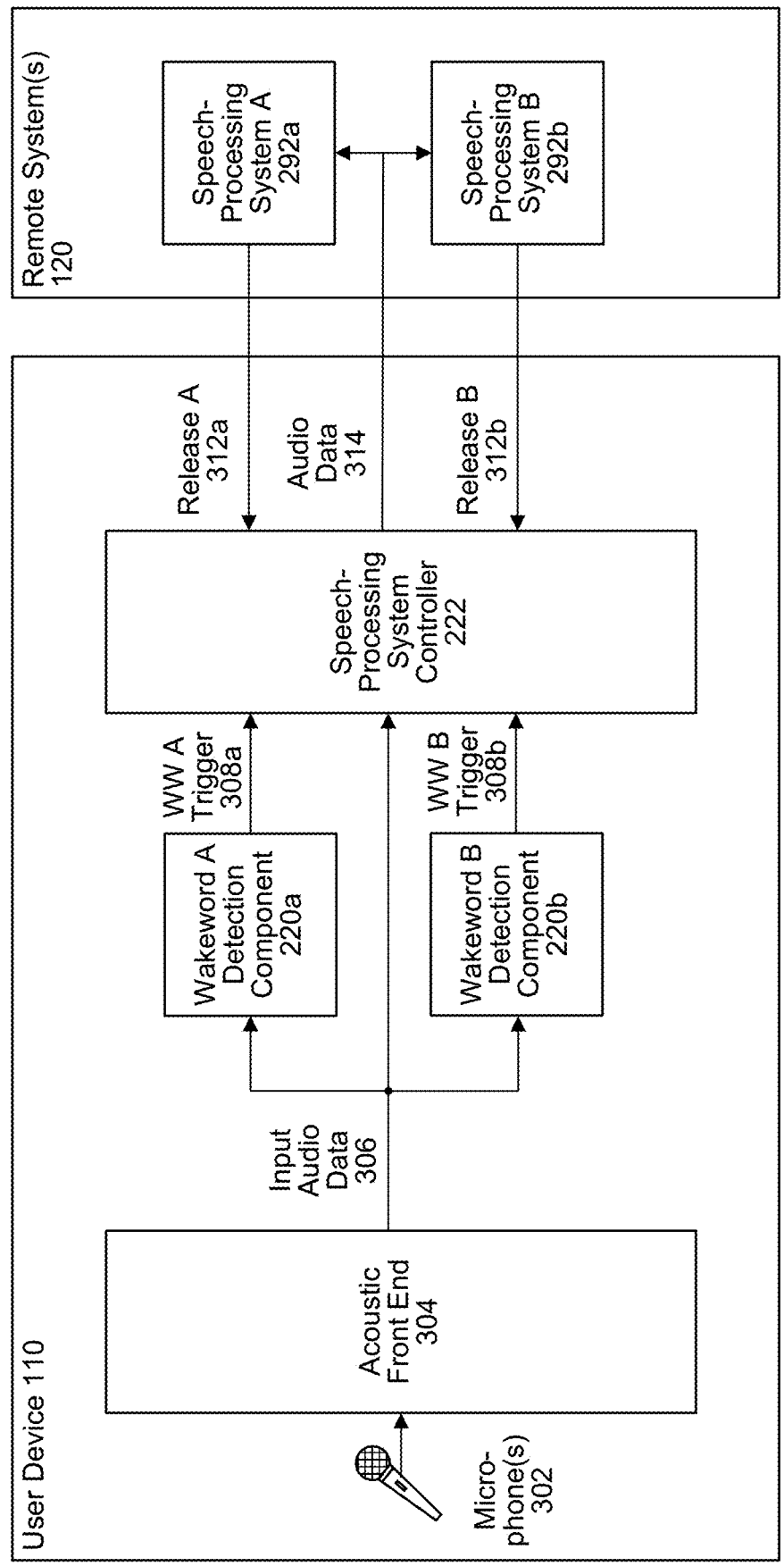

FIGS. 3A-3E illustrate systems for processing speech that includes at least one wakeword in accordance with embodiments of the present invention. Referring first to FIG. 3A, as mentioned above, the user device 110 may include one or microphones 302 for receiving audio, such as input audio 11, and determining corresponding audio data. A microphone may, for example, include a membrane that is displaced when sound waves representing the input audio 11 are incident upon, and one or more sensors for determining an amount of the displacement and outputting a corresponding signal; the amplitude of the signal may, for example, correspond to an amount of the displacement over time.

The device 110 may further include one or more acoustic front ends 304 for processing the audio data determined by the microphone 302. The acoustic front end may include, for example, an amplifier for amplifying data from the microphone 302 and an analog-to-digital converter for converting the amplified data from an analog signal to a digital signal. The digital signal may be associated with a sampling rate, such as 16 kHz. The digital signal may thus comprise data representing an amplitude of the audio data at discrete points in time in accordance with the sampling rate.

The acoustic front end 304 may further arrange the sampled audio data into groups of samples or frames. Each frame may correspond to audio data captured by the microphone over a period of time, such as 10 milliseconds. Each item of data in each frame may correspond to an average value of the samples corresponding to that frame.

The acoustic front end 304 may further include a component for performing a Fourier transform, such as a fast Fourier transform (FFT). This component may transform the audio data from time-domain audio data into frequency domain audio data representing a sum of sinusoids comprising the audio data. This component may further divide the frequency-domain audio data into groups of frequencies called bins. Using some or all of these components, the acoustic front end 304 may determine input audio data 306.

The input audio data 306 may be processed by a number of wakeword-detection components 220; FIG. 3A illustrates a first wakeword-detection component 220a and a second wakeword-detection component 220b, but the present disclosure is not limited to any number of wakeword-detection components 220. Each wakeword-detection component 220 may be configured, as described above, to detect a representation of one or more wakewords in the input audio data 306.

Each wakeword-detection component 220 may output wakeword trigger data 308 when it determines that a corresponding wakeword is present in the input audio data 306. The wakeword trigger data 308 may include a signal that has a first level (e.g., low) when the wakeword-detection component 220 does not detect a wakeword and a second level (e.g., high) when the wakeword-detection component detects the wakeword. The wakeword trigger data 308 may instead or include binary data that has a first value (e.g., 0) when the wakeword-detection component 220 does not detect a wakeword and a second value (e.g., 1) when the wakeword-detection component detects the wakeword.

The speech-processing system controller 222 may receive the wakeword trigger data 308 as well as the input audio data 306. As described herein and with greater detail below with reference to FIG. 3E, the speech-processing system controller 222 may determine, upon receiving wakeword trigger data 308 indicating detection of a wakeword, if the user device 110 is already in communication with a speech-processing system 292 as a result of, for example, prior detection of a wakeword in a particular utterance or utterances. If the user device 110 is not in communication with a speech-processing system 292, the speech-processing system controller 222 may cause sending of audio data 314 (which may be or include the input audio data 306) to a corresponding speech-processing system 292. The audio data 314 may be output by the speech-processing controller 222 and input into a speech-processing system 292 (for example as input audio data 211). If, however, the user device 110 is in communication with a speech-processing system 292, the speech-processing system controller 222 may not cause sending of the audio data 314. In various embodiments, the speech-processing system controller 222 may determine status data (e.g., a flag) that indicates whether the user device 110 is in communication with a speech-processing system 292. This status data may be determined to indicate that the user device is in communication with the speech-processing system when the speech-processing system controller 222 receives wakeword trigger data 308 indicating detection of a wakeword and when the user device 110 is not already in communication with a speech-processing system 292.

The speech-processing system controller 222 may thus cause sending of audio data 314 to a corresponding speech-processing system 292. As described herein, the speech-processing system 292 may process the audio data 314 using, for example, the ASR and/or NLU techniques described herein, to determine response data responsive to a command represented in the audio data 314. The response data may include audio data representing speech as determined by, for example, the TTS component described in greater detail below with reference to FIG. 7. The response data may instead or in addition include other data responsive to the audio data 314, such as a command to turn on a light.

The audio data 314 and response data may include a single turn of dialog; that is, the audio data 314 may include a command, and the response data includes a response to the command. The audio data 314 and response data may, instead or in addition, represent one turn of a multi-turn dialog. The response data may, for example, represent a request for further information regarding the command. An example of a single-turn dialog may include audio data 314 representing the command "Turn on the light in the kitchen"; the response data may include, for example, a command to turn on the corresponding light. An example of a multi-turn dialog may include audio data 314 representing the command, "Make a restaurant reservation for tonight"; the response data may include, for example, a request for a restaurant type and/or location. Any number of turns of dialog are within the scope of the present disclosure.

Whether the audio data 314 represents a turn of single-turn or multi-turn dialog, the speech-processing system 292 may determine that, after a certain number of turns of dialog, that the command has been fulfilled. Upon this determination, the speech-processing system 292 may send release data 312 to the speech-processing system controller 222 indicating that the communication between the user device 110 and the speech-processing system 292 is complete. Upon receipt of the response data, the speech-processing system controller 222 may determine updated status data indicating that the communication is complete. For example, the speech-processing system controller 222 may clear a bit to thereby indicate that the communication is complete.

Figure 3B:
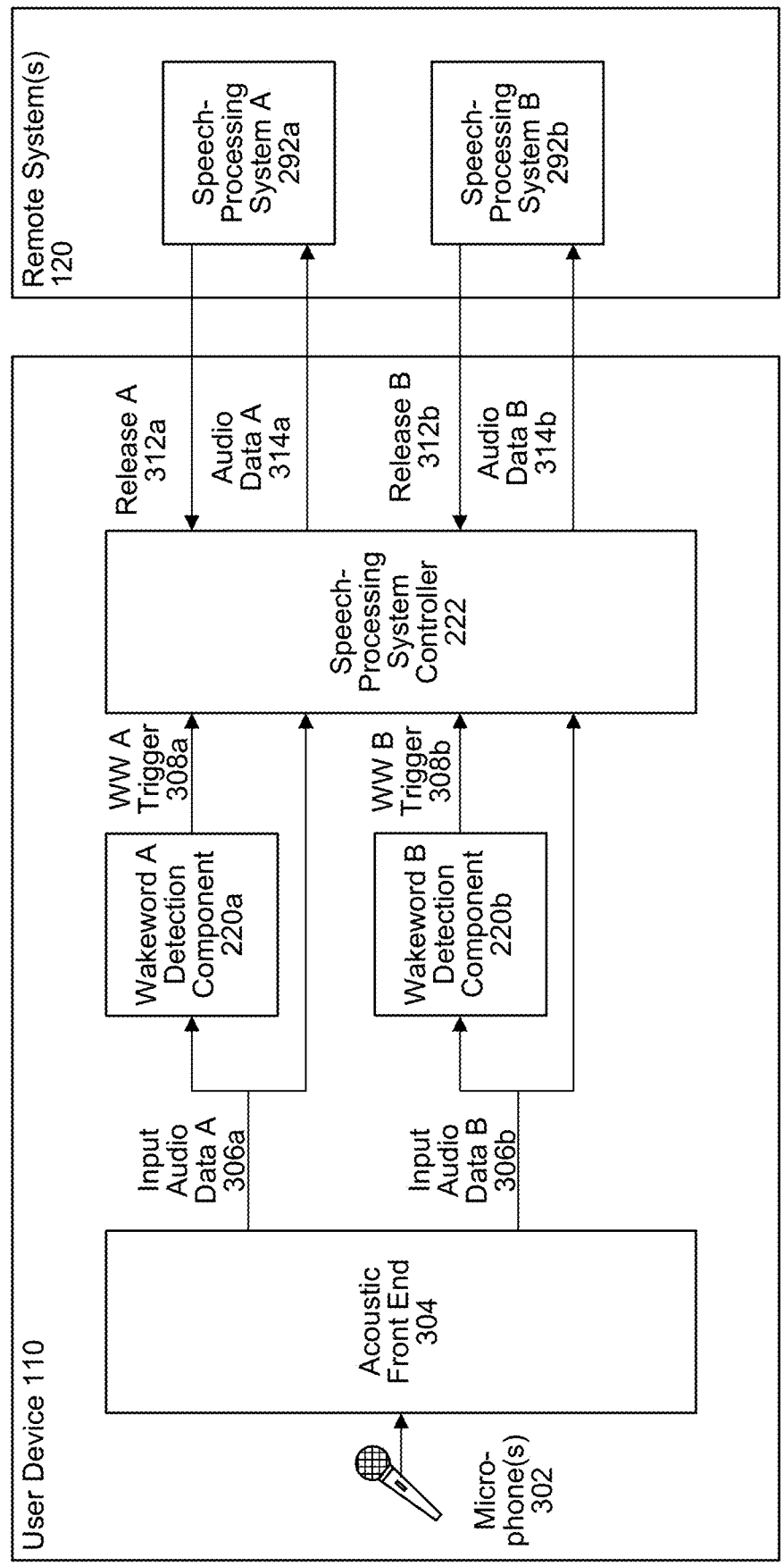

Referring to FIG. 3B, in some embodiments, a first wakeword detection component 220a may process first input audio data 306a that differs in one or more aspects from second input audio data 306b processed by a second wakeword detection component 220b. The first wakeword detection component 220a may, for example, process first input audio data 306a having a first frame size, sampling rate, and/or number of frequency bins, while the second wakeword detection component 220b may process second input audio data 306b having a second frame size, sampling rate, and/or number of frequency bins. The acoustic front end 304 may determine both the first input audio data 306a and the second input audio data 306b; in other embodiments, a first acoustic front end 304a determines the first input audio data 306a and a second acoustic front end 304b determines the second input audio data 306b. The present disclosure is not limited to any number of acoustic front ends 304 and/or any number of types of input audio data 306.

In some embodiments, when a wakeword-detection component 220 indicates that a corresponding wakeword is represented in input audio data, the speech-processing system controller 222 causes sending of corresponding audio data 314 to a speech-processing system 292. That is, if the first wakeword-detection component 220a indicates that the first wakeword is represented in input audio data 306a, the speech-processing system controller 222 causes sending of corresponding output audio data 306a to a first speech-processing system 292a, if the second wakeword-detection component 220b indicates that the second wakeword is represented in input audio data 306b, the speech-processing system controller 222 causes sending of corresponding output audio data 306b to a second speech-processing system 292b, and so on.

In other embodiments, however, the speech-processing system controller 222 may cause sending of input audio data 306 processed by a first wakeword-detection component 220a associated with a first speech-processing system 292a to a second speech-processing system 292b. Each of the first input audio data 306a and the second input audio data 306b may include a representation of the same utterance, but one of the first input audio data 306a and the second input audio data 306b may include a representation of the utterance with a higher sample rate, smaller frame size, and/or less noise. This representation may thus better represent the utterance; processing of this representation by either of the first speech-processing system 292a and/or second speech-processing system 292b may result in better response data due to, for example, more accurate ASR results.

Conversely, one of the first input audio data 306a and the second input audio data 306b may include a representation of the utterance with lower quality (as defined above) but may be smaller in size (e.g., be represented by fewer binary digits). The speech-processing system controller 222 may send this representation to either of the first or second speech-processing systems 292 to thereby reduce a transmission time of the audio data 314. In some embodiments, the speech-processing system controller 222 may determine which of the input audio data 306 to send to one of the speech-processing systems 292 based on one or more criteria, such as a speed of the network 199 connecting the user device 110 and the remote system 120. If, for example, the speed is high, the speech-processing system controller 222 may determine to send input audio data 306 having higher quality but that is larger in size; if, on the other hand, the speed is low, the speech-processing system controller 222 may determine to send input audio data 306 having lower quality but that is smaller in size.

Referring to FIG. 3C, the user device 110 may include a device speech-processing system 316 that also processes the input audio data 306. The speech-processing system 316 may include a word-detection component, similar to the wakeword-detection component 220 described herein, that is configured to detect when the input audio data 306 includes a representation of one or more words. Upon detection of these one or more words, the device speech-processing system 316 may determine corresponding command data 318. The speech-processing system controller 222 may receive the command data 318 and perform a corresponding action, which may include sending corresponding command data to one or more of the speech-processing systems 292 and/or determining new status data.

For example, the device speech-processing system 316 may be configured to determine that the input audio data 306 includes a representation of the word "stop" and/or a synonym thereof. This determination may be made when, for example, a speech-processing system 292 is sending response data to the device 110 for output thereon. The speech-processing system controller 222 may thus, upon receipt of the command data 318, send data to one or more of the speech-processing systems 292 instructing those one or more systems to cease sending the response data. The speech-processing system controller 222 may instead or in addition determine status data indicating that the user device 110 is not in communication with one or all of the speech-processing systems 292. In some embodiments, the device speech-processing system 316 receives the status data from the speech-processing system controller 222 and sends the command data 318 only if the status data indicates that the user device 110 is in communication with one or more of the speech-processing systems 292.

Referring to FIG. 3D, the user device 110 may further include one or more communication applications 224 that are configured to relay and process information between the speech-processing system controller 222 and the one or more speech-processing systems 292. For example, when a first communication application 224a receives first audio data 314a from the speech-processing system controller 222 to determine command data 320a, which it may send to a first speech-processing system 292a. The command data 320a may be or include the audio data 314a. The command data 320a may further include additional data, such as data identifying the corresponding wakeword-detection component 220a, the wakeword, the time of detection of the wakeword, the duration in time of the audio data 314a, or other such information. Duration of the audio data may be determined by determining a beginning of an utterance or portion thereof (e.g., beginpoint), the end of the utterance or portion thereof (e.g., endpoint) and determining how much time elapsed between the two. Beginpointing and endpointing are known operations in the art. For example, a beginning of a portion of an utterance may be determined, for example, by determining a transition from no detected speech in the audio data to detected speech. The beginpoint of an utterance portion (such as a word or sequence of words) may thus be indicated at a transition from no speech to speech. An end of a portion of an utterance may be detected, for example, when non-speech is detected following speech. For example, if detected non-speech following speech exceeds a certain threshold of time (e.g., 100 ms), an endpoint may be determined. The threshold may be different for determining the end of a portion of an utterance (e.g., the end of a word) versus the end of the entire utterance. For example, an entire utterance may be considered ended after a longer period of non-speech is detected. The time between beginpoint and endpoint may then be used to determine the duration.

The communication application 224a may receive, in response to the sending of the command data 320a, corresponding response data 322a from the first speech-processing system 292a. As mentioned above, the response data 322a may be a turn of a single-turn dialog or may be the final turn of a multi-turn dialog. The communication application 224a may thus determine that the response data 322a represents the end of the communication between the user device 110 and the speech-processing system 292a and may send corresponding release data 312a to the speech-processing system controller 222.

Each of the communication applications 224 may send output data corresponding to the response data 322 to an output manager component 330. The output manager component 330 may include components for storing, processing, and causing output of the output data. These components may include storage components such as computer memory, audio codecs, and or speaker drivers for driving a loudspeaker 332.

Referring to FIG. 3E, the speech-processing system controller 222 may include a status controller 350 for reading and/or writing status data 360 stored in a speech-processing status storage 352. When, for example, the status controller 350 receives wakeword trigger data 308 corresponding to detection of a keyword, it may determine, using the status data 360, whether the user device 110 is already in communication with a speech-processing system 292. For example, the status data 360 may be binary digit; when the digit is 0, it indicates that the user device 110 is not in communication with a speech-processing system 292 and when the digit is 1, it indicates that the user device 110 is in communication with a speech-processing system 292.

If the wakeword trigger data 308 is received and if the status data 360 indicates the communication, the status controller 350 may take no further action. If the wakeword trigger data 308 is received and if the status data 360 indicates no communication, the status controller 350 change the status data to indicate the communication by, for example, sending a set command 356 to the speech-processing system storage 352. If the status controller 350 receives release data 312 from another component, such as a communication application 224 and/or a speech-processing system 292, it may change the status data to indicate no communication by, for example, sending a clear command 358 to the speech-processing system storage 352.

An audio data controller 354 may, depending on the status data 360, send audio data 314 (which may be or include the input audio data 306) to a speech-processing system 292. As explained above, if the status data 360 indicates no communication, the audio data controller 354 may send the audio data 314 and if the status data 360 indicates communication, the audio data controller 354 may not send the audio data 314. The audio data controller 354 may determine which speech-processing system 292 should receive the audio data 314 based on the wakeword trigger data 308 and/or status data 360. In response to a decision to send (or actually sending) audio data 314, or in response to receiving the wakeword trigger data 308, the status controller 350 may set the bit 356 indicating that communications with a speech-processing system 292 have begun. The implementation of FIG. 3E may be expanded for multiple different wakewords and/or data processing paths such that there may be different components 350/352/354 for different wakeword processing paths and/or certain components 350/352/

354 may be configured to manage audio data for multiple different wakewords/wakeword processing paths leading to different speech processing systems 292. Thus the input audio data 306 may include a single input or multiple inputs.

In certain configurations, if enabled by user preferences and permissions, a system may process follow-up audio data without necessarily detecting a new wakeword. Thus, the system may store user preferences that allow the user to continue speaking to the system without a wakeword in certain situations to improve the user experience. For example, if the user asks the system to add something to a shopping list, the system may determine that the user has set certain permissions and preferences that allow the system to continue capturing audio data for a certain period of time (e.g., 30 seconds) or a certain number of follow-up utterances (e.g., utterances related to the shopping list command) to make adding additional items easier. Thus the user may say "Alexa, add milk to the shopping list" and follow that up by saying "add cheese," "add bread," etc. without having to say "Alexa" each time. The system may also have components to determine whether certain follow-up speech is directed at a device and, if it is, may process that speech as if it had included a wakeword. Such configurations may only be operational if a user has set permissions/preferences to enable such operation.

If such operations are permitted and enabled, the system may operate the device (e.g., through status controller 350/SPS status storage 352) to maintain status data indicating that an ongoing speech session is active with regard to a particular speech-processing system 292 until such time as the wakeword-less follow-up mode has been disabled, at which time the status may be cleared as described herein.

In another example, the system (assuming user permission) may allow a user to barge in on the system as it is outputting synthesized speech, such as output speech responsive to a user request. For example, if a user makes a request and the system responds to the request, while the system is responding the user may speak to the system to say something like "no, that's not what I said" or "stop" or other such system-directed input, even if it does not include a wakeword. Thus, the system may be configured to recognize speech that is directed at the device while the device is outputting audio or under certain other circumstances. If such a barge-in is detected the device (e.g., through status controller 350/SPS status storage 352) may set status data to indicate that an ongoing speech session is active with regard to a particular speech-processing system 292.

Figure 4A:
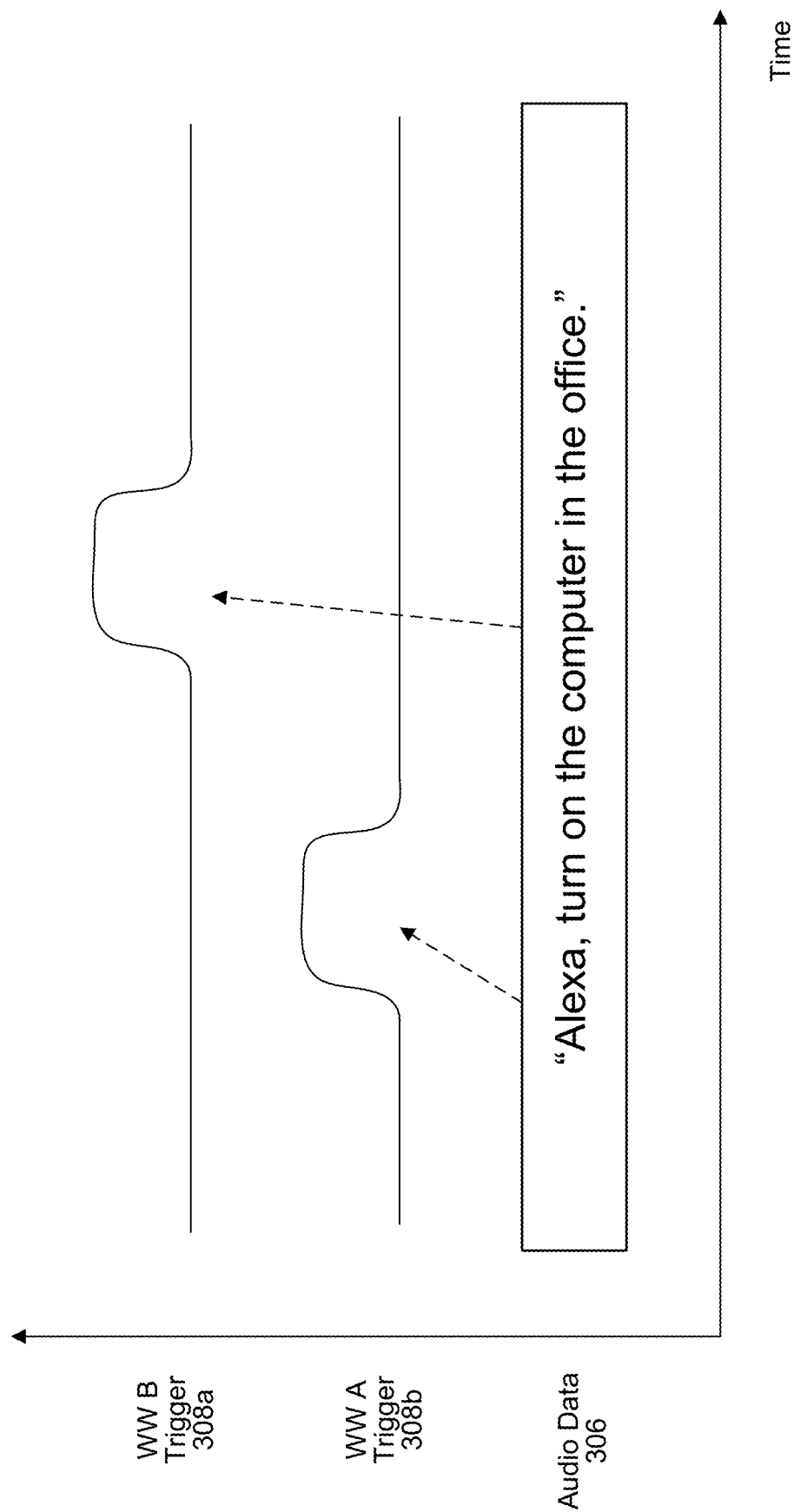
FIGS. 4A, 4B, and 4C illustrate processing speech according to embodiments of the present disclosure.
Figure 4B:
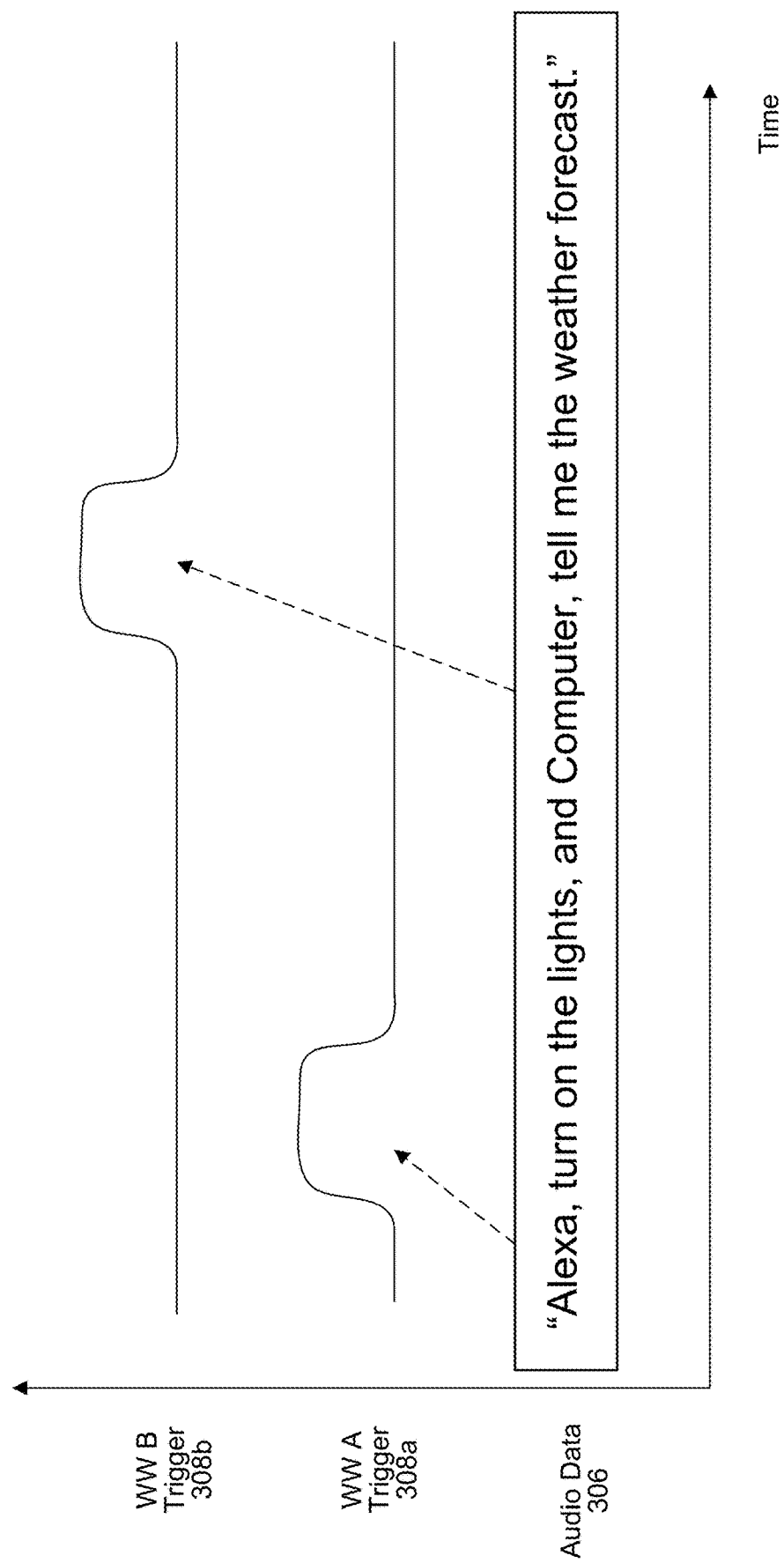
Figure 4C:
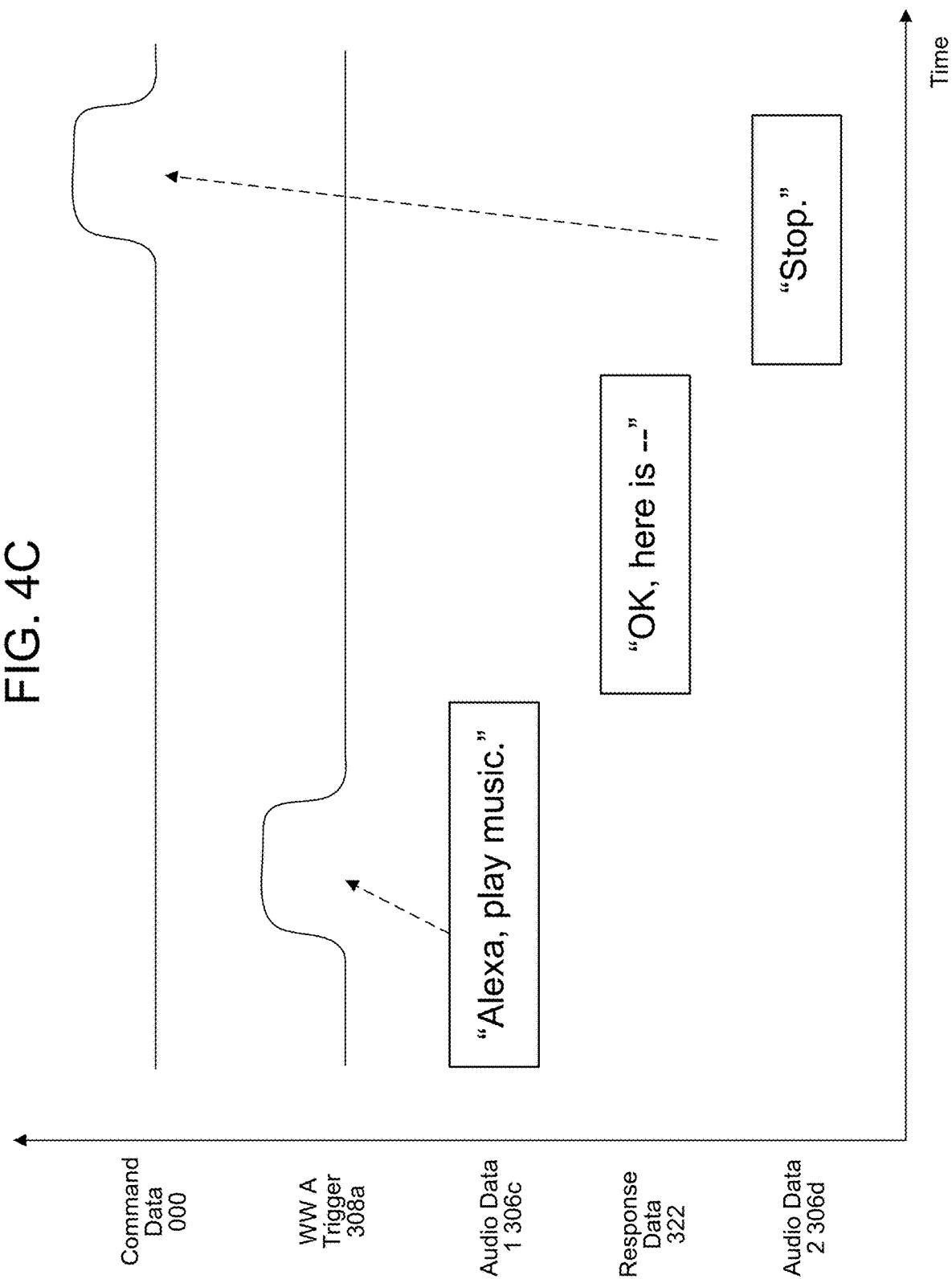

FIGS. 4A-4C illustrate audio data and corresponding detection of words therein in accordance with embodiments of the present disclosure. Referring first to FIG. 4A, as described herein, audio data 306 may include a first representation of a first wakeword ("Alexa") and a second representation of a second wakeword ("computer"). The speech-processing system controller 222 may determine status data upon detection of the first wakeword that indicates that the device 110 is in communication with a corresponding speech-processing system 292. Upon detection of the second wakeword, because the user device 110 is in communication with the first speech-processing system, the user device 110 does not send audio data to the second speech-processing system 292.

Referring to FIG. 4B, audio data 306 may similarly include representations of first and second wakewords (here, again, "Alexa" and "Computer"). The utterance of the first wakeword is associated with a first command ("turn on the lights"). Here, however, the utterance of the second wakeword is associated with a second command ("tell me the weather forecast"). The speech-processing system controller 222 may determine that the second command is associated with the second speech-processing system 292b and may send audio data corresponding to the second command to the second speech-processing system 292b. If, however, the system has sent the second audio data to the first speech-processing system 292a (because it followed so soon after the first audio data and was considered to be part of the first utterance), the system may send a command to the first speech-processing system 292a to disregard and/or discontinue processing with regard to the second audio data (e.g. the audio data associated with the second command).

In various embodiments, the speech-processing system controller 222 may make this determination by determining the temporal position of the second wakeword ("Computer") in the audio data 306. If, for example, the second wakeword appears in the first half of the audio data 306 (e.g., at least half of the words of the utterance represented in the audio data 306 appear after the second wakeword), the speech-processing system controller 222 may determine to send the corresponding audio data to the second speech-processing system 292b. In other embodiments, the speech-processing system controller 222 may determine to send the corresponding audio data to the second speech-processing system 292b if the second wakeword appears in the first 40%, 60%, or 75% of the audio data 306. In other embodiments, the speech-processing system controller 222 may determine that the audio data associated with the second command ("tell me the weather forecast") has a same or greater length or the same or more words than the audio data associated with the first command ("turn on the lights").

In certain circumstances one wakeword may sound similarly to a different wakeword such that the wakeword detectors of each wakeword may both indicate a detected wakeword for the same segment of audio data. In such a situation, the first WW trigger received by the speech-processing system controller 222 may control the further processing of the system.

Referring to FIG. 4C, as mentioned above, a device speech-processing system 316 may determine that input audio data 306 includes a representation of one or more words and may send command data 318 to the speech-processing system controller 222 in accordance therewith. In the illustrated example, first audio data 306c includes a representation of the utterance "Alexa, play music." The user device 110 may receive and begin to output response data that includes the phrase, "OK, here is —." The device speech-processing system 316 may then, however, determine that second audio data 306d includes a representation of the word "Stop." The device speech-processing system 316 may thus determine corresponding command data 318, which the speech-processing system controller 222 may send to the corresponding speech-processing system 292, which may then cease sending the response data.

FIGS. 5A and 5B illustrate methods of processing speech according to embodiments of the present disclosure. Referring first to FIG. 5A, a first wakeword-detection component 220a detects (502) that audio data includes a representation of a first wakeword and sends first wakeword detection data (504) to the speech-processing system controller 222. The speech-processing system controller 222 determines (506) whether its status data indicates if the user device 110 is already in communication with a speech-processing system 292. If yes, speech-processing system controller 222 is done (508) processing corresponding audio data. If no, the speech-processing system controller 222 determines status data indicating said communication and sends corresponding command data (512) to the first speech-processing system 292a. The command data 512 may include the audio data (e.g., audio data 211/314) of the entire utterance or the command data 512 may include the audio data (e.g., audio data 211/314) of just a portion of the utterance, for example just the command portion of the utterance (e.g., the wakeword portion removed). The command data 512 may also include other data, for example metadata corresponding to the detected wakeword, time window of the detected wakeword, user recognition data regarding the speaking user, or other types of data. When response data 514 is received therefrom, the speech-processing system controller 222 determines (516) status data indicating no communication.

As indicated by the dotted box surrounding them in FIG. 5A, operations 506, 508, and 510 may be processed in a manner by speech-processing system controller 222 in a manner that avoids system disruption should a new wakeword be detected after the operations of 506 but before setting of the status data 510 and/or determination of whether the controller 222 is done 508. Thus operations 506, 508, and 510 may be considered as a group of operations such that the system ensures that the wakeword audio that begins the operations is the wakeword audio that is used to set the status data.

Referring to FIG. 5B, the first wakeword-detection component 220a determines (520) that first audio data includes a representation of the first wakeword and sends corresponding data (522) to the speech-processing system controller 222. After determining that the status data indicates no communication, the speech-processing system controller 222 determines status data indicating communication and sends corresponding command data (526) to the first speech-processing system 292a. As above with command data 512, the command data 526 may include the audio data (e.g., audio data 211/314) of the entire utterance or the command data 526 may include the audio data (e.g., audio data 211/314) of just a portion of the utterance, for example just the command portion of the utterance (e.g., the wakeword portion removed). The command data 526 may also include other data, for example metadata corresponding to the detected wakeword, time window of the detected wakeword, user recognition data regarding the speaking user, or other types of data. Although FIG. 5B illustrates command data 526 being sent by the speech-processing system controller 222 before WW B Data 530 is received, WW B Data 530 may be received before command data 526 is sent as the status data has been set to communication 524, thus ensuring proper system operation even if WW B Data 530 is received prior to sending the command data 526. The second wakeword-detection component 220b, however, determines that second audio data includes a representation of the second wakeword to the speech-processing system controller 222. The speech-processing system controller 222 determines (532) that the status data indicates communication and thus takes no action regarding the received wakeword data (530). When the speech-processing system controller 222 receives response data (534) from the first speech-processing system 292a, it determines (536) status data indicating no communication.

In some embodiments, the user 5 may, using the user device 110, configure the first speech-processing system 292a to cause the user device 110 to output audio at a later point in time. For example, the first speech-processing system 292a may be configured to cause the user device 110 to output audio representing a daily weather report each morning at 7 AM by uttering the phrase, "Alexa, tell me the day's weather every morning at 7." This configuration may be stored in a profile associated with the user device 110 and/or user 5 in, for example, the profile storage 270. The first speech-processing system 292a may thereafter output corresponding audio in accordance with the profile at the designated time.

At the designated time, however, the user device 110 may be in communication with the second speech-processing system 292b (e.g., the status data may indicate communication with the second speech-processing system 292b). In some embodiments, the speech-processing system controller 222 causes the user device 110 to ignore any audio data sent from the first speech-processing system 292a. In other embodiments, the speech-processing system controller 222 causes the user device to cease communication with the second speech-processing system 292a (e.g., to determine that the status data indicates no communication). In still other embodiments, the speech-processing system controller 222 waits a certain amount of time (e.g., 1, 2, or 5 minutes) past the scheduled time (e.g., 7 AM); after the certain amount of time has elapsed, the speech-processing system controller 222 may either cause the device 110 to cease communication with the second speech-processing system 292a or to ignore audio data sent from the first speech-processing system 292a.

FIG. 6A illustrates how NLU processing may be performed on input text data. Generally, the NLU component 260 (such as one depicted in FIG. 2) determines a semantic interpretation of text represented in text data. That is, the NLU component 260 determines the meaning behind the text represented in text data based on the individual words. The NLU component 260 interprets text to derive an intent or a desired action of the user as well as the pertinent pieces of information in the text that allow a device (e.g., user device 110, system 120, skill(s) 290, and/or skill system(s) 225) to complete that action.

The NLU component 260 may process text data including several hypotheses of a single utterance. For example, if the ASR component 250 outputs ASR results including an N-best list of hypotheses, the NLU component 260 may process the text data with respect to all (or a portion of) the textual interpretations represented therein. The NLU component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include a shortlister component 602. The shortlister component 602 selects applications that may execute with respect to text data 694 input to the NLU component (e.g., applications that may execute the command). The shortlister component 602 thus limits downstream, more resource intensive NLU processes to being performed with respect to applications that may execute the command.

Without a shortlister component 602, the NLU component 260 may process a given hypothesis with respect to every application of the system, either in parallel, in series, or using some combination thereof. By including a shortlister component 602, the NLU component 260 may process a given hypothesis with respect to only the applications that may execute the command. This reduces total compute power and latency attributed to NLU processing.

The NLU component 260 may include one or more recognizers 604a-n. Each recognizer 604 may be associated with a different function, content source, and/or speech-processing system. The NLU component 260 may determine a function potentially associated with the command represented in text data input thereto in order to determine the proper recognizer 604 to process the hypothesis. The NLU component 260 may determine a command represented in text data is potentially associated with more than one function. Multiple recognizers 604 may be functionally linked (e.g., a telephony/communications recognizer and a calendaring recognizer may utilize data from the same contact list).

If the shortlister component 602 determines text corresponding to a hypothesis is potentially associated with multiple skills 290 and/or multiple speech-processing systems, the recognizers 604 associated with the skills 290 and/or multiple speech-processing systems (e.g., the recognizers 604 associated with the applications in the subset selected by the shortlister 602) may process the text. The selected recognizers 604 may process the text in parallel, in series, partially in parallel, etc. For example, if text corresponding to a hypothesis potentially implicates both a communications speech-processing system and a music speech-processing system, a recognizer associated with the communications speech-processing system may process the text in parallel, or partially in parallel, with a recognizer associated with the music application processing the text. The output generated by each recognizer 604 may be scored, with the overall highest scored output from all recognizers 604 ordinarily being selected to be the correct result.

The NLU component 260 may communicate with various storages to determine the potential speech-processing system(s) associated with a command represented in text data. The NLU component 260 may communicate with an NLU storage 610, which includes databases of devices (612a-612n) identifying functions associated with specific devices. For example, the user device 110 may be associated with speech-processing systems for music, calendaring, contact lists, device-specific communications, etc. In addition, the NLU component 260 may communicate with an entity library 618, which includes database entries about specific services on a specific device, either indexed by device ID, user ID, or group user ID, or some other indicator.

Each recognizer 604 may include a named entity recognition (NER) component 606. The NER component 606 attempts to identify grammars and lexical information that may be used to construe meaning with respect to a command represented in text data input therein. The NER component 606 identifies portions of text represented in text data input into the NLU component 260 that correspond to a named entity that may be recognizable by the system. The NER component 606 (or other component of the NLU component 260) may also determine whether a word refers to an entity that is not explicitly mentioned in the utterance text, for example words such as "him," "her," or "it."

Each recognizer 604, and more specifically each NER component 606, may be associated with a particular grammar model 614, a particular set of intents 616, and a particular personalized lexicon 622. Each gazetteer 620 may include function-indexed lexical information associated with a particular user and/or device. For example, gazetteer A (620a) includes function-indexed lexicons 622aa to 622an. A user's music function lexical information might include album titles, artist names, and song names, for example, whereas a user's contact-list lexical information might include the names of contacts. Since every user's music collection and contact list is presumably different, this personalized information improves entity resolution.

An NER component 606 may apply grammar models 614 and/or lexicons 622 associated with the function (associated with the recognizer 604 implementing the NER component 606) to determine a mention one or more entities in text data input thereto. In this manner, the NER component 606 may identify "slots" (i.e., particular words in text data) that may be needed for later command processing. The NER component 606 may also label each slot with a type of varying levels of specificity (e.g., noun, place, city, artist name, song name, etc.).

Each grammar model 614 may include the names of entities (i.e., nouns) commonly found in text about the particular function to which the grammar model 614 relates, whereas the lexicon 622 is personalized to the user(s) and/or the user device 110 from which the input data 311 or input text data 213 originated. For example, a grammar model 614 associated with a shopping function may include a database of words commonly used when people discuss shopping.

A process called named entity resolution may link a portion of text to an entity known to the system. To perform this named entity resolution, the NLU component 260 may use gazetteer information (620a-620n) stored in an entity library storage 618. The gazetteer information 620 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 604 may also include an intent classification (IC) component 608. The IC component 608 parses text data to determine an intent(s) of the function associated with the recognizer 604 that potentially corresponds to the text data. An intent corresponds to an action to be performed that is responsive to the command represented by the text data. The IC component 608 may communicate with a database 616 of words linked to intents. For example, a music intent database may link words and phrases such as "quiet," "volume off," and "mute" to a "mute" intent. The IC component 608 identifies potential intents by comparing words in the text data to the words and phrases in an intents database 616 associated with the function that is associated with the recognizer 604 implementing the IC component 608.

The intents identifiable by a specific IC component 608 may be linked to function-specific (i.e., the function associated with the recognizer 604 implementing the IC component 608) grammar model 614 with "slots" to be filled. Each slot of a grammar model 614 may correspond to a portion of the text data that the system believes corresponds to an entity. For example, a grammar model 614 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 614 may not be structured as sentences, but rather based on associating slots with grammatical tags.

For example, an NER component 606 may parse text data to identify words as subject, object, verb, preposition, etc. based on grammar rules and/or models prior to recognizing named entities in the text data. An IC component 608 (implemented by the same recognizer 604 as the NER component 606) may use the identified verb to identify an intent. The NER component 606 may then determine a grammar model 614 associated with the identified intent. For example, a grammar model 614 for an intent corresponding to <PlayMusic> may specify a list of slots applicable to play the identified object and any object modifier (e.g., a prepositional phrase), such as {Artist Name}, {Album Name}, {Song name}, etc. The NER component 606 may then search corresponding fields in a lexicon 622 associated with the function associated with the recognizer 604 implementing the NER component 606 and may match words and phrases in the text data the NER component 606 previously tagged as a grammatical object or object modifier with those identified in the lexicon 622.

The NER component 606 may perform semantic tagging, which is the labeling of a word or combination of words according to their type/semantic meaning. The NER component 606 may parse text data using heuristic grammar rules, or a model may be constructed using techniques such as hidden Markov models, maximum entropy models, log linear models, conditional random fields (CRF), and the like. For example, an NER component 606 implemented by a music function recognizer 604 may parse and tag text corresponding to "play mother's little helper by the rolling stones" as {Verb}: "Play," {Object}: "mother's little helper," {Object Preposition}: "by," and {Object Modifier}: "the rolling stones." The NER component 606 may identify "Play" as a verb based on a word database associated with the music function, which an IC component 608 (which may also implemented by the music function recognizer 604) may determine that the word corresponds to a <PlayMusic> intent. At this stage, no determination may have been made as to the meaning of "mother's little helper" and "the rolling stones," but based on grammar rules and models, the NER component 606 may have determined that the text of these phrases relates to the grammatical object (i.e., entity) of the text data.

The frameworks linked to the intent may then be used to determine what database fields may be searched to determine the meaning of these phrases, such as searching a user's gazetteer 620 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 620 does not resolve a slot/field using gazetteer information, the NER component 606 may search, in the knowledge base 624, the database of generic words associated with the function. For example, if the text data includes text corresponding to "play songs by the rolling stones," after failing to determine an album name or song name called "songs" by "the rolling stones," the NER component 606 may search the function's vocabulary for the word "songs." In the some embodiments, generic words may be checked before the gazetteer information, or both may be tried, potentially producing two different results.

The NLU component 260 may tag text to attribute meaning to the text. For example, the NLU component 260 may tag "play mother's little helper by the rolling stones" as {intent}: <PlayMusic>, {artist name}: rolling stones, {media type}: SONG, and {song title}: mother's little helper. In another example, the NLU component 260 may tag "play songs by the rolling stones" as {intent}: <PlayMusic>, {artist name}: rolling stones, and {media type}: SONG.

The shortlister component 602 may receive text data 694 output from the ASR component 250 (as illustrated in FIG. 6B). The ASR component 250 may embed the text data 694 into a form processable by a trained model(s) using sentence-embedding techniques. Sentence embedding may include, in the text data 694, text in a structure that enables the trained models of the shortlister component 602 to operate on the text. For example, an embedding of the text data 694 may be a vector representation of the text data.

The shortlister component 602 may make binary determinations (e.g., yes or no determinations) regarding which skill(s) 290 relate to the text data 694. The shortlister component 602 may make such determinations using the one or more trained models described herein above. If the shortlister component 602 implements a single trained model for each skill 290, the shortlister component 602 may simply run the models that are associated with enabled applications as indicated in a profile associated with the user device 110 and/or user that originated the command.

The shortlister component 602 may generate N-best list data representing applications that may execute with respect to the command represented in the text data 694. The size of the N-best list represented in the N-best list data is configurable. In an example, the N-best list data may indicate every application of the system as well as contain an indication, for each application, regarding whether the application is likely capable to execute the command represented in the text data 694. In another example, instead of indicating every application of the system, the N-best list data may only indicate all of the applications that are likely to be able to execute the command represented in the text data 694. In yet another example, the shortlister component 602 may implement thresholding such that the N-best list data may indicate no more than a maximum number of applications that may execute the command represented in the text data 694. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 694 by the shortlister component 602 relative to such applications).

The NLU component 260 may compile data, output by each of the recognizers 604 that processed the text data input to the NLU component 260, into a single N-best list, and may send N-best list data 640 (representing the N-best list) to a pruning component 650 (as illustrated in FIG. 6B). Each entry in the N-best list data 640 may correspond to tagged text output by a different recognizer 604. Each entry in the N-best list data 640 may be associated with a respective score indicating the tagged text corresponds to the function associated with the recognizer 604 from which the tagged text was output. For example, the N-best list data 640 may be represented as:

| | |
|---|---|
| [0.95] Intent: <PlayMusic> | Source: Alexa, SmartCar |
| [0.70] Intent: <RollWindow> | Source: SmartCar |
| [0.01] Intent: <Navigate> | Source: Alexa, SmartCar |
| [0.01] Intent: <PlayVideo> | Source: Alexa |

The pruning component 650 creates a new, shorter N-best list (i.e., represented in N-best list data 660 discussed below) based on the N-best list data 640. The pruning component 650 may sort the tagged text represented in the N-best list data 640 according to their respective scores.

The pruning component 650 may perform score thresholding with respect to the N-best list data 640. For example, the pruning component 650 may select entries represented in the N-best list data 640 associated with a score satisfying (e.g., meeting and/or exceeding) a score threshold. The pruning component 650 may also or alternatively perform number of entry thresholding. For example, the pruning component 650 may select the top scoring entry(ies) associated with each different category of function (e.g., music, shopping, communications, etc.) represented in the N-best list data 640, with the new N-best list data 660 including a total number of entries meeting or falling below a threshold number of entries. The purpose of the pruning component 650 is to create a new list of top scoring entries so that downstream, more resource intensive processes may only operate on the tagged text entries that most likely correspond to the command input to the system.

The NLU component 260 may also include a light slot filler component 652. The light slot filler component 652 can take text from slots represented in the tagged text entry or entries output by the pruning component 650 and alter it to make the text more easily processed by downstream components. The light slot filler component 652 may perform low latency operations that do not involve heavy operations such as reference to a knowledge base. The purpose of the light slot filler component 652 is to replace words with other words or values that may be more easily understood by downstream components. For example, if a tagged text entry includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the N-best list data 660.

The NLU component 260 sends the N-best list data 660 to an entity resolution component 670. The entity resolution component 670 can apply rules or other instructions to standardize labels or tokens from previous stages into an intent/slot representation. The precise transformation may depend on the function (e.g., for a travel function, the entity resolution component 670 may transform a text mention of "Boston airport" to the standard BOS three-letter code referring to the airport). The entity resolution component 670 can refer to an authority source (e.g., a knowledge base) that is used to specifically identify the precise entity referred to in each slot of each tagged text entry represented in the N-best list data 660. Specific intent/slot combinations may also be tied to a particular source, which may then be used to resolve the text. In the example "play songs by the stones," the entity resolution component 670 may reference a personal music catalog, Amazon Music account, user profile (described herein), or the like. The entity resolution component 670 may output data including an altered N-best list that is based on the N-best list represented in the N-best list data 660, but also includes more detailed information (e.g., entity IDs) about the specific entities mentioned in the slots and/or more detailed slot data that can eventually be used by a function. The NLU component 260 may include multiple entity resolution components 670 and each entity resolution component 670 may be specific to one or more functions.

The entity resolution component 670 may not be successful in resolving every entity and filling every slot represented in the N-best list data 660. This may result in the entity resolution component 670 outputting incomplete results. The NLU component 260 may include a final ranker component 690, which may consider such errors when determining how to rank the tagged text entries for potential execution. For example, if a book function recognizer 604 outputs a tagged text entry including a <ReadBook> intent flag, but the entity resolution component 670 cannot find a book with a title matching the text of the item, the final ranker component 690 may re-score that particular tagged text entry to be given a lower score. The final ranker component 690 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 690 may apply re-scoring, biasing, or other techniques to obtain the most preferred tagged and resolved text entry. To do so, the final ranker component 690 may consider not only the data output by the entity resolution component 670, but may also consider other data 691. The other data 691 may include a variety of information. For example, the other data 691 may include function rating or popularity data. For example, if one function has a particularly high rating, the final ranker component 690 may increase the score of a tagged text entry or entries associated with or otherwise invoking that particular function. The other data 691 may also include information about functions that have been specifically enabled by the user. For example, the final ranker component 690 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of user device 110, user ID, context, and other information may also be considered. For example, the final ranker component 690 may consider when any particular functions are currently active (e.g., music being played, a game being played, etc.). Following final ranking, the NLU component 260 may output NLU output data 685 to the orchestrator component 240. The NLU output data 685 may include various entries, with each entry representing an NLU processing confidence score, an intent, slot data, and a potential skill or skill that may operating with respect to the respective entry's data.

Following preliminary ranking, the NLU component 260 may output NLU results data 685. The NLU component 260 may send the NLU results data 685 to the orchestrator component 240. The NLU results data 685 may include first NLU results data 685a including tagged text associated with a first speech-processing system, second NLU results data 685b including tagged text associated with a second speech-processing system, etc. The NLU results data 685 may include tagged text data corresponding to the top scoring tagged text entries as determined by the preliminary ranker component 690.

The data 685 output from the NLU component 260 may include an N-best list of NLU results, where each item in the N-best list may correspond to a particular recognizer 604 and corresponding skill 290. Thus, for example, first NLU results of the N-best list may be associated with a first skill 290a, second NLU results of the N-best list may be associated with a second skill 290b, third NLU results of the N-best list may be associated with a third skill 290c, etc. Moreover, the first NLU results may correspond to text tagged to attribute meaning that enables the first skill 290a to execute with respect to the first NLU results, the second NLU results may correspond to text tagged to attribute meaning that enables the second skill 290b to execute with respect to the second NLU results, the third NLU results may correspond to text tagged to attribute meaning that enables the third skill 290c to execute with respect to the third NLU results, etc. The data 685 may also include scores corresponding to each item in the N-best list. Alternatively, the NLU result data 685 output to a particular skill 290 may include NER and IC data output by the particular skill's recognizer 604 while the NLU result data 685 output to the orchestrator component 240 may include only a portion of the NLU result data 685, for example the scores corresponding to certain skills.

The system may be configured with thousands, tens of thousands, etc. skills 290. The orchestrator component 240 enables the system to better determine the best skill 290 to execute the command input to the system. For example, first NLU results may correspond or substantially correspond to second NLU results, even though the first NLU results are operated on by a first skill 290a and the second NLU results are operated on by a second skill 290b. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The orchestrator component 240 may solicit the first skill 290a and the second skill 290b to provide potential result data based on the first NLU results and the second NLU results, respectively. For example, the orchestrator component 240 may send the first NLU results to the first skill 290a along with a request for the first skill 290a to at least partially execute a command with respect to the first NLU results. The orchestrator component 240 may also send the second NLU results to the second skill 290b along with a request for the second skill 290b to at least partially execute a command with respect to the first NLU results. The orchestrator component 240 receives, from the first skill 290a, first result data generated from the first skill's execution with respect to the first NLU results. The orchestrator component 240 also receives, from the second skill 290b, second results data generated from the second skill's execution with respect to the second NLU results.

The result data 630 may include various components. For example, the result data 630 may include content (e.g., audio data, text data, and/or video data) to be output to a user. The result data 630 may also include a unique identifier (ID) used by the remote system 120 and/or the skill server(s) 225 to locate the data to be output to a user. The result data 630 may also include an instruction. For example, if the command corresponds to "turn on the light," the result data 630 may include an instruction causing the system to turn on a light associated with a profile of the user device 110 and/or user.

The orchestrator component 240 may, prior to sending the NLU results data 685 to the orchestrator component 240, associate intents in the NLU results data 685 with skills 290. For example, if the NLU results data 685 includes a <PlayMusic> intent, the orchestrator component 240 may associate the NLU results data 685 with one or more skills 290 that can execute the <PlayMusic> intent. Thus, the orchestrator component 240 may send the NLU results data 685 paired with skills 290 to the orchestrator component 240. In response to input text data corresponding to "what should I do for dinner today," the orchestrator component 240 may generates pairs of skills 290 with associated intents corresponding to:

Skill 1/<Roll Down Window>
Skill 2/<Start Navigation>
Skill 3/<Play Music>

A system that does not use the orchestrator component 240 as described above may instead select the highest scored preliminary ranked NLU results data 685 associated with a single skill. The system may send the NLU results data 685 to the skill 290 along with a request for output data. In some situations, the skill 290 may not be able to provide the system with output data. This results in the system indicating to the user that the command could not be processed even though another skill associated with lower ranked NLU results data 685 could have provided output data responsive to the command.

Components of a system that may be used to perform unit selection, parametric TTS processing, and/or model-based audio synthesis are shown in FIG. 7. As shown in FIG. 7, the TTS component/processor 780 may include a TTS front end 716, a speech synthesis engine 718, TTS unit storage 772, TTS parametric storage 780, and a TTS back end 734. The TTS unit storage 772 may include, among other things, voice inventories 778a-288n that may include pre-recorded audio segments (called units) to be used by the unit selection engine 730 when performing unit selection synthesis as described below. The TTS parametric storage 780 may include, among other things, parametric settings 768a-268n that may be used by the parametric synthesis engine 732 when performing parametric synthesis as described below. A particular set of parametric settings 768 may correspond to a particular voice profile (e.g., whispered speech, excited speech, etc.).

In various embodiments of the present invention, model-based synthesis of audio data may be performed using by a speech model 722 and a TTS front end 716. The TTS front end 716 may be the same as front ends used in traditional unit selection or parametric systems. In other embodiments, some or all of the components of the TTS front end 716 are based on other trained models. The present invention is not, however, limited to any particular type of TTS front end 716. The speech model 722 may be used to synthesize speech without requiring the TTS unit storage 772 or the TTS parametric storage 780, as described in greater detail below.

The TTS front end 716 transforms input text data 710 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 710 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 780, within the memory and/or storage of the server 120, device 110, or within an external device.

Text data 710 input into the TTS component 780 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 780 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 780 to craft a natural-sounding audio waveform output. The language dictionary may also include letter-to-sound rules and other tools that may be used to pronounce previously unidentified words or letter combinations that may be encountered by the TTS component 780. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 780. Such acoustic features may include syllable-level features, word-level features, emotion, speaker, accent, language, pitch, energy, duration, and the like. Application of acoustic features may be based on prosodic models available to the TTS component 780. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778*a-n*). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 212 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 780 may be configured to perform TTS processing in multiple languages. For each language, the TTS component 780 may include specially configured data, instructions and/or components to synthesize speech in the desired language(s). To improve performance, the TTS component 780 may revise/update the contents of the TTS storage 780 based on feedback of the results of TTS processing, thus enabling the TTS component 780 to improve speech recognition.

The TTS storage component 780 may be customized for an individual user based on his/her individualized desired speech output. In particular, the speech unit stored in a unit database may be taken from input audio data of the user speaking. For example, to create the customized speech output of the system, the system may be configured with multiple voice inventories 778a-278n, where each unit database is configured with a different "voice" to match desired speech qualities. Such voice inventories may also be linked to user accounts. The voice selected by the TTS component 780 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 780 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 722 to ultimately create the output audio data 212.

When performing unit selection, after a unit is selected by the unit selection engine 730, the audio data corresponding to the unit may be passed to the audio data modification component 720. The audio data modification component 720 may then process the audio data of the unit to create modified audio data where the modified audio data reflects a desired audio quality. The audio data modification component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 780. For each unit that corresponds to the selected portion, the audio data modification component 720 may process the audio data for that unit to create a modified unit audio data. The modified unit audio data may then be concatenated to form the output audio data 212. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 780. In that case, other output data 785 may be output along with the output audio data 212 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 212 may include other output data 785 that may include a prosody tag or other indicator that instructs the device 110 to slow down the playback of the output audio data 212, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

As illustrated in FIG. 8, the user-recognition component 295 may include one or more subcomponents including a vision component 808, an audio component 810, a biometric component 812, a radio-frequency (RF) component 814, a machine-learning (ML) component 816, and a recognition confidence component 818. In some instances, the user-recognition component 295 may monitor data and determinations from one or more subcomponents to determine an identity of one or more users associated with data input to the system. The user-recognition component 295 may output user-recognition data 895, which may include a user identifier associated with a user the system believes is originating data input to the system. The user-recognition data 895 may be used to inform processes performed by the orchestrator 240 (or a subcomponent thereof) as described below.

The vision component 808 may receive data from one or more sensors capable of providing images (e.g., cameras) or sensors indicating motion (e.g., motion sensors). The vision component 808 can perform facial recognition or image analysis to determine an identity of a user and to associate that identity with a user profile associated with the user. In some instances, when a user is facing a camera, the vision component 808 may perform facial recognition and identify the user with a high degree of confidence. In other instances, the vision component 808 may have a low degree of confidence of an identity of a user, and the user-recognition component 295 may utilize determinations from additional components to determine an identity of a user. The vision component 808 can be used in conjunction with other components to determine an identity of a user. For example, the user-recognition component 295 may use data from the vision component 808 with data from the audio component 810 to identify what user's face appears to be speaking at the same time audio is captured by the user device 110 for purposes of identifying a user who spoke an input to the user device 110.

The user device 110 may include biometric sensors that transmit data to the biometric component 812. For example, the biometric component 812 may receive data corresponding to fingerprints, iris or retina scans, thermal scans, weights of users, a size of a user, pressure (e.g., within floor sensors), etc., and may determine a biometric profile corresponding to a user. The biometric component 812 may distinguish between a user and sound from a television, for example. Thus, the biometric component 812 may incorporate biometric information into a confidence level for determining an identity of a user.

The RF component 814 may use RF localization to track devices that a user may carry or wear. For example, a user may be associated with a device. The device may emit RF signals (e.g., Wi-Fi, Bluetooth®, etc.). The user device 110 may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user identifier.

In some instances, the user device 110 may include some RF or other detection processing capabilities so that a user who speaks an input may scan, tap, or otherwise acknowledge his/her personal device to the user device 110. In this manner, the user may "register" with the user device 110 for purposes of the user device 110 determining who spoke a particular input. Such a registration may occur prior to, during, or after speaking of an input.

The ML component 816 may track the behavior of various users as a factor in determining a confidence level of the identity of the user. For example, a user may adhere to a regular schedule such that the user is at a first location during the day (e.g., at work or at school). In this example, the ML component 816 factors in past behavior and/or trends into determining the identity of the user that provided input to the user device 110. Thus, the ML component 816 may use historical data and/or usage patterns over time to increase or decrease a confidence level of an identity of a user.

In some instances, the recognition confidence component 818 receives determinations from the various components 808, 810, 812, 814, and 816, and may determine a final confidence level associated with the identity of a user. The confidence level or other score data may be included in the user-recognition data 895.

The audio component 810 may receive data from one or more sensors capable of providing an audio signal (e.g., one or more microphones) to facilitate recognizing a user. The audio component 810 may perform audio recognition on an audio signal to determine an identity of the user and associated user identifier. In some instances, the audio component 810 may perform voice recognition to determine an identity of a user.

The audio component 810 may also perform user identification based on audio received by the user device 110. The audio component 810 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 810 may perform user recognition by comparing audio characteristics representing the audio to stored audio characteristics of users.

Figure 9:
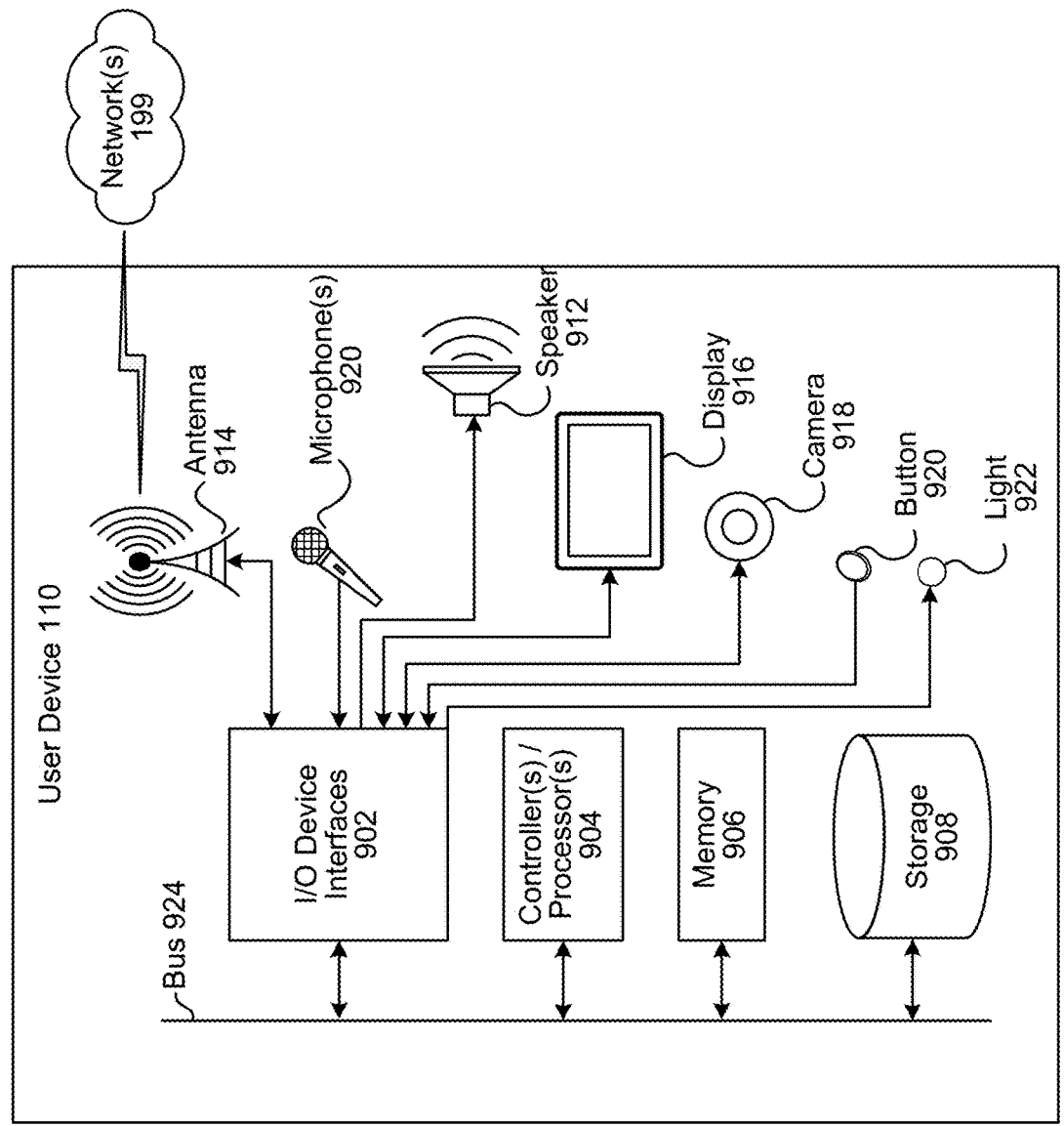
FIG. 9 illustrates example components of a user device according to embodiments of the present disclosure.
Figure 10:
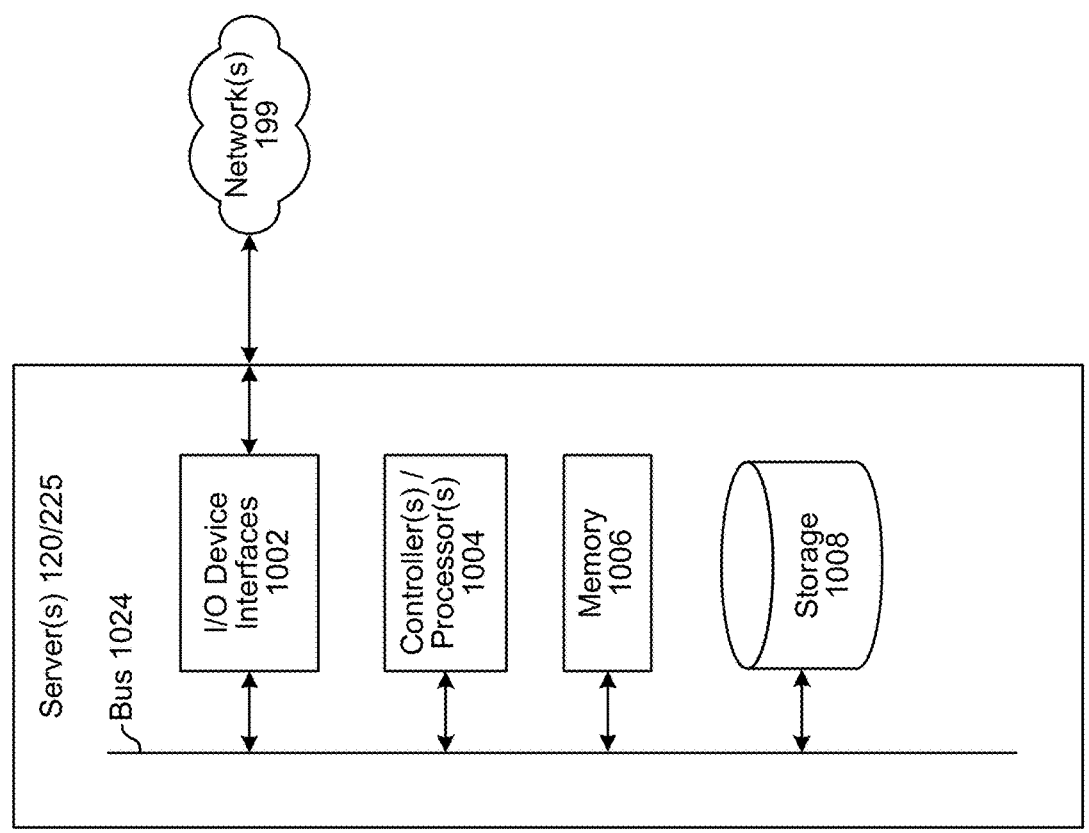
FIG. 10 illustrates example components of a remote system according to embodiments of the present disclosure.

FIG. 9 is a block diagram conceptually illustrating a user device 110 that may be used with the system. FIG. 10 is a block diagram conceptually illustrating example components of a remote device, such as the system(s) 120, which may assist with ASR processing, NLU processing, etc., and the skill system(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill system(s) 225 for performing actions responsive to user inputs, etc. In operation, each of these devices (or groups of devices) may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the user device 110 may include input/output device interfaces 902 that connect to a variety of components such as an audio output component such as a speaker 912, a wired headset or a wireless headset (not illustrated), or other component capable of outputting audio. The user device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 916 for displaying content. The user device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (902/1002), processor(s) (904/1004), memory (906/1006), and/or storage (908/1008) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the system(s) 120, and the skill system(s) 225, as described herein, are illustrative, and may be located as a stand-alone device or may be included, in whole or in part, as a component of a larger device or system.

As illustrated in FIG. 11, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a vehicle 110e, a display vehicle 110f, and/or a smart television 110g may be connected to the network(s) 199 through a wireless service provider, over a Wi-Fi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc., of one or more servers 120.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method for processing data representing a spoken command, the method comprising:
    determining first audio data representing a first portion of an utterance;
    determining, using a first wakeword-detection component of a user device, that the first audio data includes a first representation of a first wakeword corresponding to a first speech-processing system;
    determining second audio data representing a second portion of the utterance;
    determining that first status data indicates no communication with a second speech-processing system;
    determining second status data indicating communication with the first speech-processing system;
    sending, to the first speech-processing system, the second audio data;
    determining third audio data representing a third portion of the utterance;
    determining, using a second wakeword-detection component of the user device, that the third audio data includes a second representation of a second wakeword corresponding to the second speech-processing system;
    determining that the second status data indicates communication with the first speech-processing system;
    sending, to the first speech-processing system, the third audio data;
    receiving, from the first speech-processing system, response data corresponding to the second audio data; and
    causing output of the response data.

2. The method of claim 1, further comprising:
    while causing output of the response data, determining fourth audio data representing a second utterance;
    determining that the fourth audio data includes a representation of a command to cease output;
    sending, to the first speech-processing system, second command data corresponding to the command; and
    determining third status data indicating communication with the first speech-processing system has completed.

3. The method of claim 1, further comprising:
    determining first detected non-speech corresponding to a beginning of the second audio data;
    determining second detected non-speech corresponding to an end of the second audio data;
    determining, using the beginning of the second audio data and the end of the second audio data, a first duration of the second audio data;
    determining a second duration of the third audio data;
    determining that the second duration is greater than the first duration;
    determining that the third audio data includes a representation of second command data; and
    sending, to the second speech-processing system, the second command data.

4. The method of claim 1, further comprising:
    determining a user profile associated with the user device;
    determining that the user profile corresponds to a request for scheduled output data associated with the second speech-processing system;
    ceasing the output;
    causing second output of the output data; and
    determining third status data indicating communication with the second speech-processing system.

5. A computer-implemented method comprising:
    determining first audio data corresponding to a first portion of an utterance;
    determining, using a first component of a user device, that the first audio data includes a first representation of a first wakeword corresponding to a first speech-processing system;
    sending, to the first speech-processing system, first data corresponding to the first audio data;
    determining second audio data corresponding to a second portion of the utterance;
    determining, using a second component of the user device, that the second audio data includes a second representation of a second wakeword corresponding to a second speech-processing system;
    determining that the user device is in communication with the first speech-processing system;
    sending, to the first speech-processing system, second data corresponding to the second audio data; and
    based at least in part on the user device being in communication with the first speech-processing system, refraining from sending the second data to the second speech-processing system.

6. The computer-implemented method of claim 5, further comprising:
    receiving output audio data corresponding to the utterance; and causing output audio corresponding to the output audio data to be output, wherein input audio corresponding to the second audio data is received while the output audio is being output;

wherein determining that the user device is in communication with the first speech-processing system further comprises determining that state data indicates the user device was associated with the first speech-processing system when the input audio was detected.

7. The computer-implemented method of claim 5, further comprising:

prior to sending the first data, determining that first status data indicates the user device is not in communication with the second speech-processing system; and while the first speech-processing system is processing the first data, determining that second status data indicates the user device is in communication with the first speech-processing system;

wherein refraining from sending the second data to the second speech-processing system is based at least in part on the second status data.

8. The computer-implemented method of claim 7, further comprising:

receiving, from the first speech-processing system, response data corresponding to the first data and the second data;

causing output of the response data; and after causing output of the response data, determining that third status data indicates that the user device is not in communication with the first speech-processing system.

9. The computer-implemented method of claim 5, further comprising:

determining that the second audio data includes a third representation of a command;

sending, to the first speech-processing system, a command to discontinue processing with regard to the second audio data; and sending, to the second speech-processing system, third data corresponding to the second audio data.

10. The computer-implemented method of claim 5, further comprising:

receiving, from the first speech-processing system, response data corresponding to the first data and the second data;

determining a first output of a first portion of the response data;

determining third audio data representing a second utterance;

determining that the third audio data includes a representation of a command corresponding to the response data; and determining a second output of a second portion of the response data in accordance with the command.

11. The computer-implemented method of claim 5, further comprising:

receiving, from the first speech-processing system, response data;

causing first output of a first portion of the response data;

determining a profile associated with the user device;

determining that the profile corresponds to output data associated with the second speech-processing system; and causing second output of the output data.

12. The computer-implemented method of claim 5, further comprising:

determining third audio data corresponding to a second utterance;

processing, using the first component, the third audio data;

determining fourth audio data corresponding to the second utterance;

determining, using the second component, that the fourth audio data includes a third representation of the second wakeword; and sending, to the second speech-processing system, third data corresponding to the third audio data.

13. A computing device comprising:

at least one processor; and at least one memory including instructions that, when executed by the at least one processor, cause the computing device to:

determine first audio data corresponding to a first portion of an utterance;

determine, using a first component of the computing device, that the first audio data includes a first representation of a first wakeword corresponding to a first speech-processing system;

send, to the first speech-processing system, first data corresponding to the first audio data;

determine second audio data corresponding to a second portion of the utterance;

determine, using a second component of the computing device, that the second audio data includes a second representation of a second wakeword corresponding to a second speech-processing system;

determine that the computing device is in communication with the first speech-processing system;

send, to the first speech-processing system, second data corresponding to the second audio data; and based at least in part on the computing device being in communication with the first speech-processing system, refrain from sending the second data to the second speech-processing system.

14. The computing device of claim 13, wherein the at least one memory further includes instructions that, when executed by the at least one processor, further cause the computing device to:

receive output audio data corresponding to the utterance;

cause output audio corresponding to the output audio data to be output, wherein input audio corresponding to the second audio data is received while the output audio is being output; and determine that the computing device is in communication with the first speech-processing system at least in part by determining that state data indicates the computing device was associated with the first speech-processing system when the input audio was detected.

15. The computing device of claim 13, wherein the at least one memory further includes instructions that, when executed by the at least one processor, further cause the computing device to:

prior to sending the first data, determine that first status data indicates the computing device is not in communication with the second speech-processing system;

while the first speech-processing system is processing the first data, determine that second status data indicates the computing device is in communication with the first speech-processing system; and refrain from sending the second data to the second speech-processing system based at least in part on the second status data.

16. The computing device of claim 15, wherein the at least one memory further includes instructions that, when executed by the at least one processor, further cause the computing device to:
- receive, from the first speech-processing system, response data corresponding to the first data and the second data;
- cause output of the response data; and
- after causing output of the response data, determine that third status data indicates that the computing device is not in communication with the first speech-processing system.

17. The computing device of claim 13, wherein the at least one memory further includes instructions that, when executed by the at least one processor, further cause the computing device to:
- determine that the second audio data includes a third representation of a command;
- send, to the first speech-processing system, a command to discontinue processing with regard to the second audio data; and
- send, to the second speech-processing system, third data corresponding to the second audio data.

18. The computing device of claim 13, wherein the at least one memory further includes instructions that, when executed by the at least one processor, further cause the computing device to:
- receive, from the first speech-processing system, response data corresponding to the first data and the second data;
- determine a first output of a first portion of the response data;
- determine third audio data representing a second utterance;
- determine that the third audio data includes a representation of a command corresponding to the response data; and
- determine a second output of a second portion of the response data in accordance with the command.

19. The computing device of claim 13, wherein the at least one memory further includes instructions that, when executed by the at least one processor, further cause the computing device to:
- receive, from the first speech-processing system, response data;
- cause first output of a first portion of the response data;
- determine a profile associated with the computing device;
- determine that the profile corresponds to output data associated with the second speech-processing system; and
- cause second output of the output data.

20. The computing device of claim 13, wherein the at least one memory further includes instructions that, when executed by the at least one processor, further cause the computing device to:
- determine third audio data corresponding to a second utterance;
- process, using the first component, the third audio data;
- determine fourth audio data corresponding to the second utterance;
- determine, using the second component, that the fourth audio data includes a third representation of the second wakeword; and
- send, to the second speech-processing system, third data corresponding to the third audio data.

* * * * *